(12) United States Patent
Wang et al.

(10) Patent No.: US 12,147,087 B2
(45) Date of Patent: Nov. 19, 2024

(54) OPTICAL COMPONENT DRIVING MECHANISM

(71) Applicant: TDK TAIWAN CORP., Taoyuan (TW)

(72) Inventors: Guan-Bo Wang, Taoyuan (TW); Shao-Chung Chang, Taoyuan (TW); Chen-Hsin Huang, Taoyuan (TW); Liang-Ting Ho, Taoyuan (TW); Chih-Wen Chiang, Taoyuan (TW); Kai-Po Fan, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 452 days.

(21) Appl. No.: 17/522,688

(22) Filed: Nov. 9, 2021

(65) Prior Publication Data

US 2022/0146781 A1     May 12, 2022

Related U.S. Application Data

(60) Provisional application No. 63/111,276, filed on Nov. 9, 2020.

(51) Int. Cl.
*G02B 7/02*        (2021.01)
*G02B 7/04*        (2021.01)

(52) U.S. Cl.
CPC .............. *G02B 7/023* (2013.01); *G02B 7/04* (2013.01)

(58) Field of Classification Search
CPC ........ G02B 7/023; G02B 7/04; G02B 27/646; G03B 13/36; G03B 30/00; G03B 2205/0069
USPC ................................. 359/823, 822, 819, 811
See application file for complete search history.

(56) References Cited

U.S. PATENT DOCUMENTS

| | | | |
|---|---|---|---|
| 2017/0214831 A1* | 7/2017 | Ha | H04N 23/54 |
| 2020/0033556 A1* | 1/2020 | Huang | H02K 41/0356 |
| 2020/0033700 A1* | 1/2020 | Wu | G02B 7/09 |
| 2020/0166771 A1* | 5/2020 | Huang | G02B 27/646 |
| 2020/0348532 A1* | 11/2020 | Park | G02B 7/02 |
| 2023/0204903 A1* | 6/2023 | Chen | G02B 7/08 |
| | | | 359/823 |

* cited by examiner

*Primary Examiner* — William R Alexander
(74) *Attorney, Agent, or Firm* — MUNCY, GEISSLER, OLDS & LOWE, PC

(57) ABSTRACT

An optical component driving mechanism is provided, including a holder, a fixed portion, a driving assembly, and a first circuit assembly. The holder is used to connect the optical component. The holder is movable relative to the fixed portion. The driving assembly is used to drive the holder to move relative to the fixed portion. The first circuit assembly is fixedly disposed on the holder. The first circuit assembly is electrically connected to the driving assembly.

19 Claims, 20 Drawing Sheets

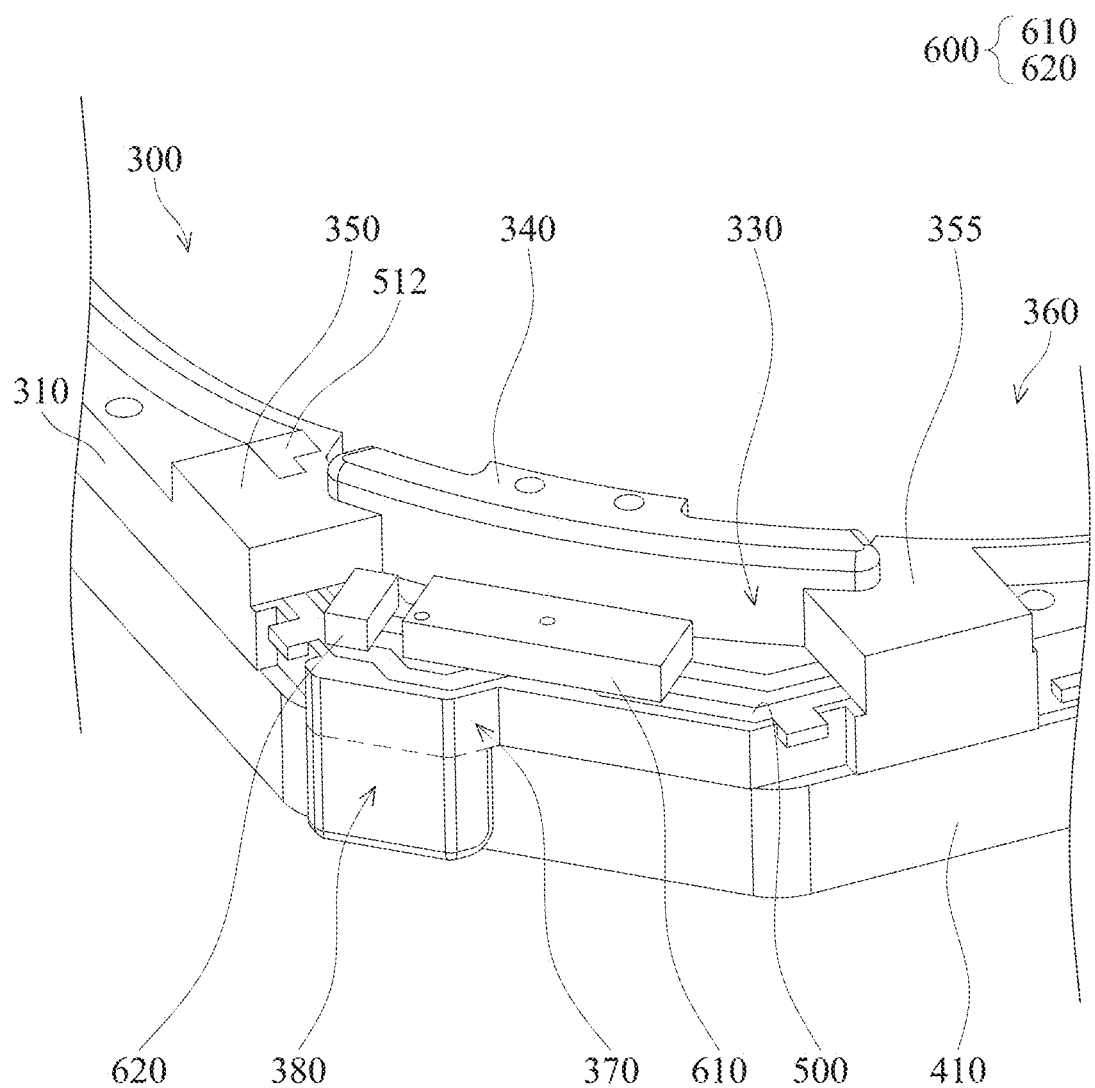
FIG. 3
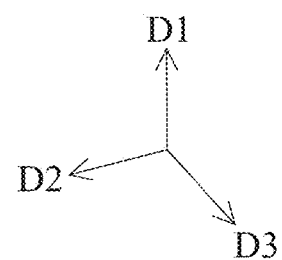

OPTICAL COMPONENT DRIVING MECHANISM

CROSS REFERENCE TO RELATED APPLICATIONS

This application claims the benefit of U.S. Provisional Application No. 63/111,276 filed Nov. 9, 2020, the entirety of which is incorporated by reference herein.

BACKGROUND OF THE INVENTION

Field of the Invention

The present disclosure relates to an optical component driving mechanism, and more particularly to an optical component driving mechanism with a circuit assembly disposed within a holder.

Description of the Related Art

With the development of technology, many electronic devices (such as smartphones) nowadays are equipped with a camera and have the ability to record videos. The user can use the camera module installed in the electronic device to operate the electronic device to capture a variety of photos, bringing people rich visual enjoyment.

The aforementioned electronic devices with camera or video functions are usually provided with an optical component driving mechanism to drive the optical component to move along the optical axis to achieve the function of autofocus (AF). However, given the demand for miniaturization of electronic devices, many problems such as difficulty in designing the driving mechanism of the optical component, poor reliability, and an insufficient lens driving force occur often. Therefore, how to solve the aforementioned problems has become an important challenge.

BRIEF SUMMARY OF THE INVENTION

The present invention provides an optical component driving mechanism, including a holder, a fixed portion, a driving assembly, and a first circuit assembly. The holder configured to connect an optical component. The holder is movable relative to the fixed portion. The driving assembly configured to drive the holder to move relative to the fixed portion. The first circuit assembly fixedly disposed on the holder. The first circuit assembly is electrically connected to the driving assembly.

According to some embodiments of the present disclosure, the optical component driving mechanism further including a sensing assembly, the sensing assembly includes a sensing component. The sensing assembly is configured to sense the movement of the holder.

According to some embodiments of the present disclosure, the holder includes a body, a first groove, a stopper component, a first protruding platform, and an accommodating space. The first groove has a groove structure, for accommodating the sensing component. The stopper component has a protruding structure, configured to limit the range of movement of the holder. The first protruding platform has a protruding structure, adjacent to the first groove. The accommodating space is for accommodating the optical component.

According to some embodiments of the present disclosure, the holder further includes a fixed portion for the driving assembly and a holding portion for the driving assembly. The fixed portion for the driving assembly protrudes outward from the body, and is configured to secure a first coil of the driving assembly. The holding portion for the driving assembly protrudes from the fixed portion for the driving assembly, and is configured to secure the first coil. The extending direction of the fixed portion for the driving assembly and the extending direction of the holding portion for the driving assembly are different, and the first coil is located between the holding portion for the driving assembly and the body.

According to some embodiments of the present disclosure, when the holder is in a first limit position, the stopper component is in direct contact with the fixed portion. The shortest distance between the stopper component and the fixed portion is smaller than the shortest distance between the first protruding platform and the fixed portion.

According to some embodiments of the present disclosure, the optical component driving mechanism further includes a first elastic component. The first elastic component includes a fixed end for a movable portion. The first elastic component has a plate-like structure perpendicular to a first axis. The holder is movably connected to the fixed portion via the first elastic component. The fixed end for the movable portion is fixedly disposed on the first protruding platform.

According to some embodiments of the present disclosure, the optical component driving mechanism further includes a second elastic component. The second elastic component has a plate-like structure perpendicular to the first axis. The holder is movably connected to the fixed portion via the second elastic component. The driving assembly is electrically connected to the second elastic component. The first circuit assembly is electrically connected to the driving assembly via the second elastic component. The first elastic component and the second elastic component are arranged along the first axis.

According to some embodiments of the present disclosure, the first circuit assembly includes a first circuit component. The first circuit component has a strip structure, a first segment portion, and a first circuit contact. The first circuit component is electrically connected to the sensing component. A thickness of the first circuit component is between 0.05 mm and 0.25 mm. The first circuit component is at least partially embedded in the body and at least partially not exposed on the body. The first segment portion extends in a direction perpendicular to the first axis. The sensing component is electrically connected to an external circuit via the first circuit contact. The first circuit contact is disposed on the first protruding platform and is electrically connected to the first elastic component.

According to some embodiments of the present disclosure, the first circuit assembly includes a second circuit component. The second circuit component has a strip structure, a second segment portion, and a second circuit contact. The second circuit component is electrically connected to the sensing component. A thickness of the second circuit component is between 0.05 mm and 0.25 mm. The second circuit component is at least partially embedded in the body and at least partially not exposed on the body. The second segment portion extends in a direction that is perpendicular to the first axis. The second segment portion at least partially overlaps the first coil when viewed along the first axis. The second circuit contact is electrically connected to the first elastic component.

According to some embodiments of the present disclosure, the first circuit assembly includes a third circuit component. The third circuit component has a strip structure, a third segment portion, and a third circuit contact. The third circuit component is electrically connected to the sensing component. A thickness of the third circuit component is between 0.05 mm and 0.25 mm. The third circuit component is at least partially embedded in the body and at least partially not exposed on the body. The third segment portion extends in a direction that is perpendicular to the first axis. The third segment portion at least partially overlaps the first coil when viewed along the first axis. The third circuit contact is electrically connected to the first elastic component.

According to some embodiments of the present disclosure, the first circuit assembly includes a fourth circuit component. The fourth circuit component has a strip structure, a fourth segment portion, and a fourth circuit contact. The fourth circuit component is electrically connected to the sensing component. A thickness of the fourth circuit component is between 0.05 mm and 0.25 mm. The fourth circuit component is at least partially embedded in the body and at least partially not exposed on the body. The fourth segment portion extends in a direction that is perpendicular to the first axis. The fourth circuit contact is electrically connected to the first elastic component.

According to some embodiments of the present disclosure, the first circuit contact, the second circuit contact, the third circuit contact, and the fourth circuit contact have rotational symmetry when viewed along the first axis.

According to some embodiments of the present disclosure, the first circuit contact, the second circuit contact, the third circuit contact, and the fourth circuit contact have a line of symmetry when viewed along the first axis.

According to some embodiments of the present disclosure, the first segment portion is at least partially located in the fixed portion for the driving assembly. The first segment portion and the first coil at least partially overlap when viewed along the first axis. The first segment portion and a portion of the second segment portion are parallel and side by side with each other. A portion of the third segment portion and the fourth segment portion are parallel and side by side with each other when viewed along the first axis.

According to some embodiments of the present disclosure, the third segment portion and the fourth segment portion at least partially overlap when viewed along the first axis.

According to some embodiments of the present disclosure, the first circuit contact, the second circuit contact, the third circuit contact and the fourth circuit contact are on the same level when viewed along a second axis, which is perpendicular to the first axis.

According to some embodiments of the present disclosure, the first segment portion, the second segment portion, the third segment portion, and the fourth segment portion are on the same level when viewed along a second axis perpendicular to the first axis.

According to some embodiments of the present disclosure, the first circuit component includes a fifth circuit component. The fifth circuit component has a strip structure and a fifth segment portion. The fifth circuit component is electrically connected to the sensing component. A thickness of the fifth circuit component is between 0.05 mm and 0.25 mm. The fifth circuit component is at least partially embedded in the body and at least partially not exposed on the body. The fifth segment portion extends along the first axis. The fifth segment portion at least partially overlaps the first coil when viewed along a second axis perpendicular to the first axis. The first coil is electrically connected to the sensing component via the fifth circuit component.

According to some embodiments of the present disclosure, the optical component is fixedly connected to the holder via an adhesive component.

According to some embodiments of the present disclosure, each of the first circuit component, the second circuit component, the third circuit component, and the fifth circuit component includes a strengthening portion. The strengthening portion is at least partially exposed to the accommodating space. The adhesive component is in direct contact with the strengthening portion.

BRIEF DESCRIPTION OF THE DRAWINGS

In order to make the above and other objectives, features, and advantages of the present disclosure more obvious and understandable, preferred embodiments are listed below in conjunction with the accompanying drawings, which are described in detail as follows.

FIG. 3 is a partial perspective view of the holder according to some embodiments of the present disclosure.

DETAILED DESCRIPTION OF THE INVENTION

In order to make the purpose, features, and advantages of the present disclosure more obvious and understandable, the following embodiments are specially cited, and the accompanying drawings are used for detailed description. Among them, the configuration of each element in the embodiment is for illustrative purposes, and is not intended to limit the disclosure. In addition, part of the repetition of the reference numbers in the embodiments is for simplifying the description, and does not mean the relevance between different embodiments. The directional terms mentioned in the following embodiments, for example: up, down, left, right, front or back, etc., are only directions for referring to the attached drawings. Therefore, the directional terms used are used to illustrate and not to limit the disclosure.

In addition, relative terms such as "lower" or "bottom" and "higher" or "top" may be used in the embodiments to describe the relative relationship between one element of the illustration and another element. It can be understood that if the illustrated device is turned upside down, the elements described on the "lower" side will become the elements on the "higher" side.

The optical component driving mechanism of the embodiment of the present invention is described below. However, it can be easily understood that the embodiments of the present invention provide many suitable inventive concepts and can be implemented in a wide variety of specific backgrounds. The specific embodiments disclosed are only used to illustrate the use of the present invention in a specific method, and are not used to limit the scope of the present invention. Unless otherwise defined, all terms used here (including technical and scientific terms) have the same meanings commonly understood by the general artisans to whom the disclosures in this article belong. It is understandable that these terms, such as the terms defined in commonly used dictionaries should be interpreted as having a meaning consistent with the relevant technology and the background or context of this disclosure, and should not be interpreted in an idealized or excessively formal way, unless specifically defined herein.

Figure 1:
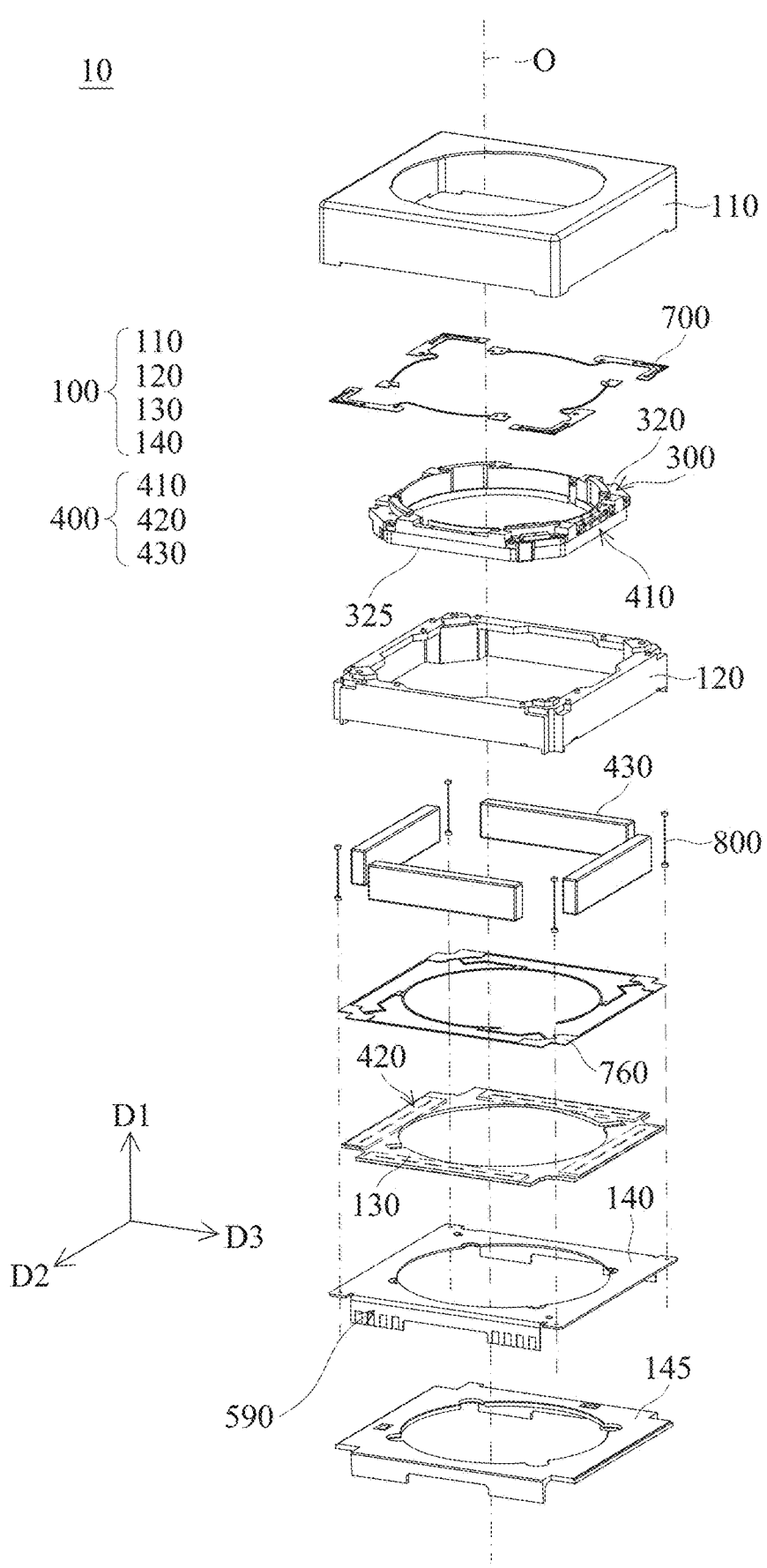
FIG. 1 is an exploded view of an optical component driving mechanism according to some embodiments of the disclosure.

Please refer to FIG. 1. FIG. 1 is an exploded view of the optical component driving mechanism 10 according to some embodiments of the disclosure. The aforementioned optical component driving mechanism 10 may be disposed in an electronic device such as a camera, a tablet computer or a mobile phone, and has an accommodating portion or a holder and may be configured to carry an optical component, such as an optical lens with one or a plurality of lenses.

Figure 7A:
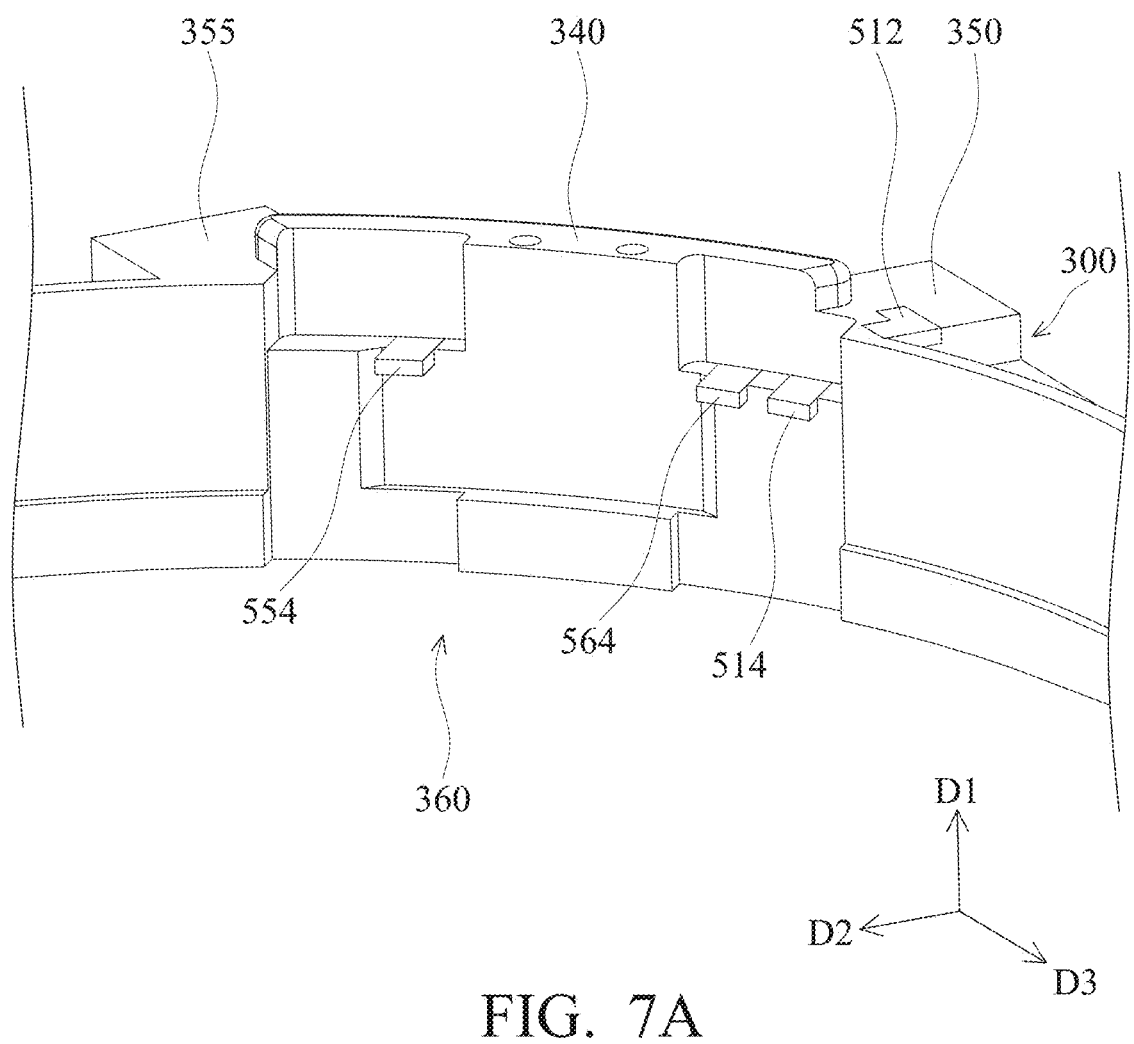
FIG. 7A is a perspective view of a portion of the accommodating space of the holder according to some embodiments of the present disclosure, showing a strengthening portion exposed to the accommodating space.
Figure 7B:
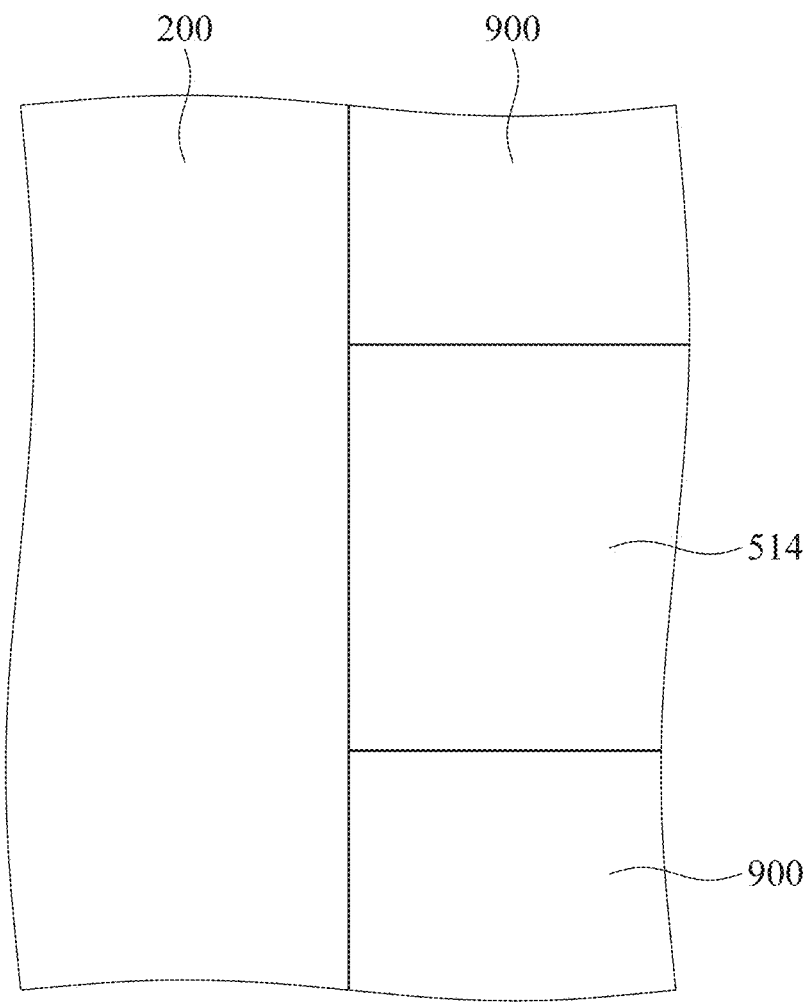
FIG. 7B is a schematic diagram of the contact of the optical component, the strengthening portion, and the adhesive component according to some embodiments of the present disclosure.

As shown in FIG. 1, the optical component driving mechanism 10 includes a fixed portion 100, an optical component 200 (FIG. 7B), a holder 300, a driving assembly 400, a first circuit assembly 500 (FIG. 2A), a second circuit assembly 590, a sensing assembly 600 (FIG. 2A), a first elastic member 700, a second elastic member 760, four suspension components 800, and an adhesive component 900 (FIG. 7B).

The fixed portion 100 includes a housing 110, a frame 120, a flat plate 130, an upper base 140, and a lower base 145. The housing 110 and the lower base 145 of the fixed portion 100 are combined and fixed with each other to form a space, to provide the aforementioned components to be disposed therein and protect the aforementioned component.

The holder 300 is a movable portion that is movable relative to the fixed portion 100. The holder 300 includes an upper portion 320 facing the housing 110 and a lower portion 325 facing the lower base 145. The holder 300 is configured to hold the optical component 200, and the holder 300 is movable relative to the fixed portion 100 by the driving of the driving assembly 400. The structure of the holder 300 will be described in more detail in FIG. 2A to FIG. 3.

The driving assembly 400 includes a first coil 410, two sets of second coils 420 (four in total), and four magnetic components 430. The first coil 410 is disposed on the holder 300, and is configured to drive the holder 300 to move relative to the fixed portion 100 along a first axis D1, so that the optical component driving mechanism 10 achieves auto focus (AF). Two sets of second coils 420 are disposed in the flat plate 130, and are configured to drive the holder 300 to move relative to the fixed portion 100 along a second axis D2 and a third axis D3, so that the optical component driving mechanism 10 achieves optical image stabilization (OIS).

When light from the outside enters the optical component driving mechanism 10 that holds the optical component 200, the incident light passes from the light incident end (near the housing 110) through the optical component 200 disposed in the optical component driving mechanism 10, to the light emitting end (near the lower base 145) along an optical axis O of the optical component 200, and to a photosensitive component module (not shown) outside the optical component driving mechanism 10 to obtain images.

The first circuit assembly 500 is fixedly disposed on the holder 300. Portions of the first circuit assembly 500 may be seen in FIGS. 2A to 2B, and its structure will be described in detail with reference to FIGS. 6A to 6D. The second circuit assembly 590 is disposed on the upper base 140. The sensing assembly 600 is disposed on the holder 300 and is electrically connected to the first circuit assembly 500. The sensing assembly 600 is described in detail in relation to FIG. 2A.

The first elastic component 700 and the second elastic component 760 may be upper and lower leaf springs. The first elastic component 700 and the second elastic component 760 are arranged along the first axis D1. The first elastic component 700 and the second elastic component 760 have a plate-like structure perpendicular to the first axis D1. That is to say, the thickness of the first elastic component 700 and the second elastic component 760 on the first axis D1 is smaller than the length and width of the first elastic component 700 and the second elastic component 760 on the second axis D2 and the third axis D3. In addition, the first elastic component 700 and the second elastic component 760 generally have a planar structure.

The first elastic component 700 is connected to the upper portion 320 of the holder 300. The second elastic member 760 is connected to the lower portion 325 of the holder 300. Therefore, the holder 300 is movably disposed within the fixed portion 100.

The first elastic component 700 is electrically connected to the second circuit assembly 590 disposed on the upper base 140 via the suspension components 800. The second elastic component 760 is electrically connected to the first coil 410. The connection between the first elastic component 700 and the holder 300 is described in detail in relation to FIG. 8 and FIG. 11.

Figure 2A:
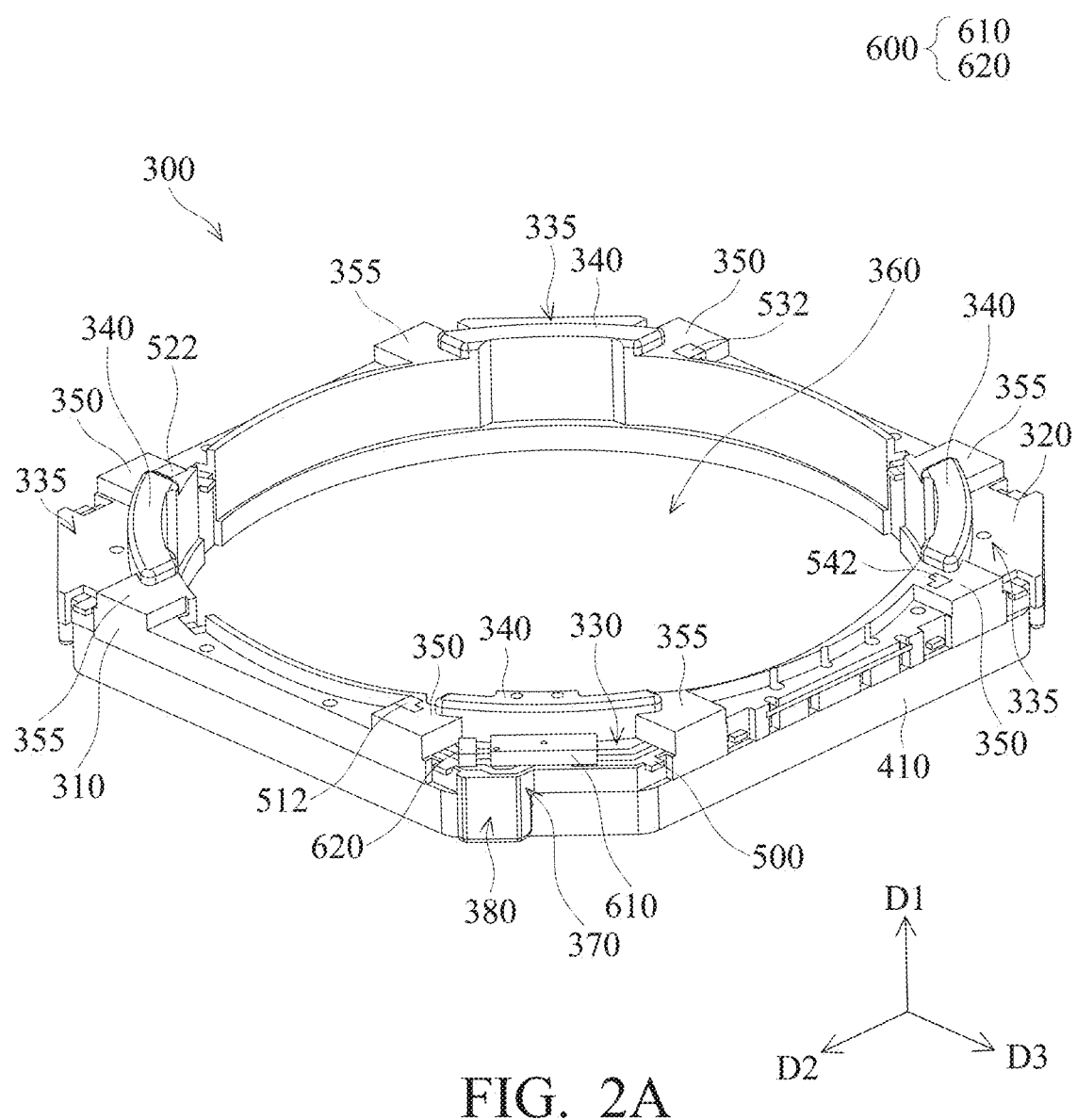
FIG. 2A is a perspective view of the holder and the first coil according to some embodiments of the disclosure.
Figure 2B:
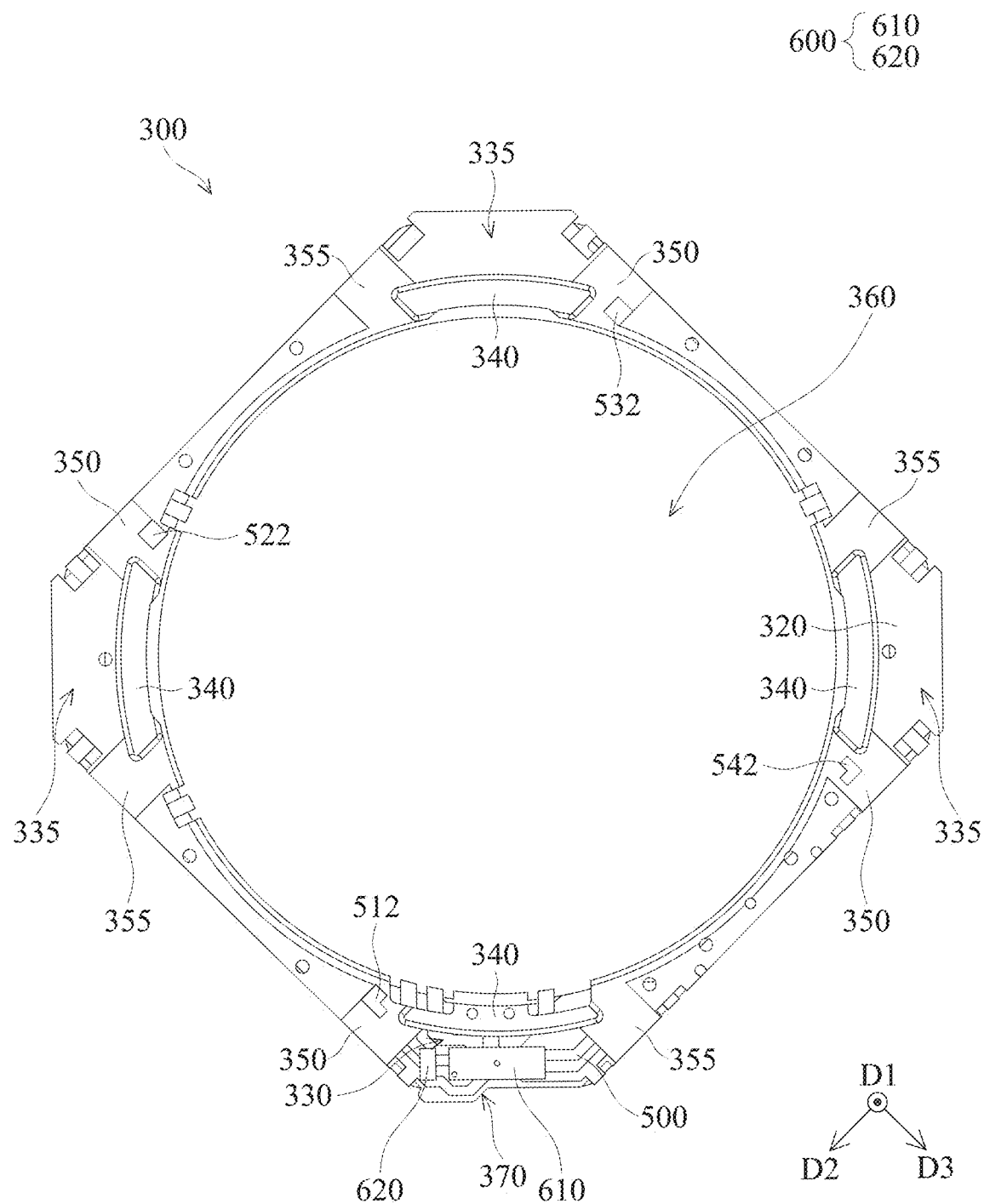
FIG. 2B is a top view of the holder according to some embodiments of the present disclosure.

Please refer to FIG. 2A to FIG. 2B. FIG. 2A is a perspective view of the holder 300 and the first coil 410 in FIG. 1. FIG. 2B shows a top view of the holder 300 in FIG. 2A, the first circuit assembly 500 partially exposed on the holder 300 and the sensing assembly 600 disposed on the holder 300 can be seen.

The first circuit assembly 500 is fixedly disposed on the holder 300, and is electrically connected to the first coil 410 and the sensing assembly 600. The first circuit assembly 500 is connected to the first coil 410 via the second elastic component 760 (FIG. 1). The structure of the first circuit assembly 500 is described in detail in relation to FIGS. 6A to 6E.

The sensing assembly 600 includes a sensing component 610 and a capacitor 620. The sensing component 610 is an all-in-one IC that encapsulates a sensing integrated circuit and a control integrated circuit in the same package. The sensing component 610 may sense the position of the holder 300, and then control the holder 300 to move to a desired position to achieve closed loop control.

FIG. 3 is a partial perspective view of the holder 300 of FIG. 2A, showing the sensing assembly 600 and a portion of the first coil 410 disposed on the holder 300. Please refer to FIG. 2A to FIG. 3 together, the holder 300 has a body 310, a first groove 330, three second grooves 335, four stopper components 340, four first protruding platforms 350, four second protruding platforms 355, an accommodating space 360, four fixed portions for the driving assembly 370, and four holding portions for the driving assembly 380.

The first groove 330 is a groove structure located at a corner of the holder 300, and the sensing assembly 600 is disposed therein. The second grooves 335 are also groove structures, and each are located at the other three corners of the holder 300. The protruding structures surrounding the first groove 330 and the second groove 335 are respectively the stopper component 340, the first protruding platform 350, and a protruding platform 355. The first protruding platform 350 and the second protruding platform 355 are at the two sides of the stopper component 340. The configuration of the stopper component 340 is described in detail in relation to FIG. 5.

The accommodating space 360 is used for accommodating the optical component 200 (FIG. 7B). In detail, the optical component 200 is fixedly disposed in the accommodating space 360 via the adhesive component 900. The configuration of the optical component 200 and the adhesive component 900 in the accommodating space 360 is described in detail in relation to FIG. 7B.

The fixed portion for the driving assembly 370 protrudes outward from the body 310. The holding portion for the driving assembly 380 protrudes from the fixed portion for the driving assembly 370. The fixed portion for the driving assembly 370 and the holding portion for the driving assembly 380 are used to secure the first coil 410. The fixed portion for the driving assembly 370 and the holding portion for the driving assembly 380 are described in detail in relation to FIG. 4.

It should be noted that the number of components described above is not limited by this embodiment. That is to say, the present disclosure may also include a different number of first grooves 330, second grooves 335, stopper components 340, first protruding platforms 350, second protruding platforms 355, accommodating spaces 360, fixed portions for the driving assembly 370, and the holding portions for the driving assembly 380.

Figure 4:
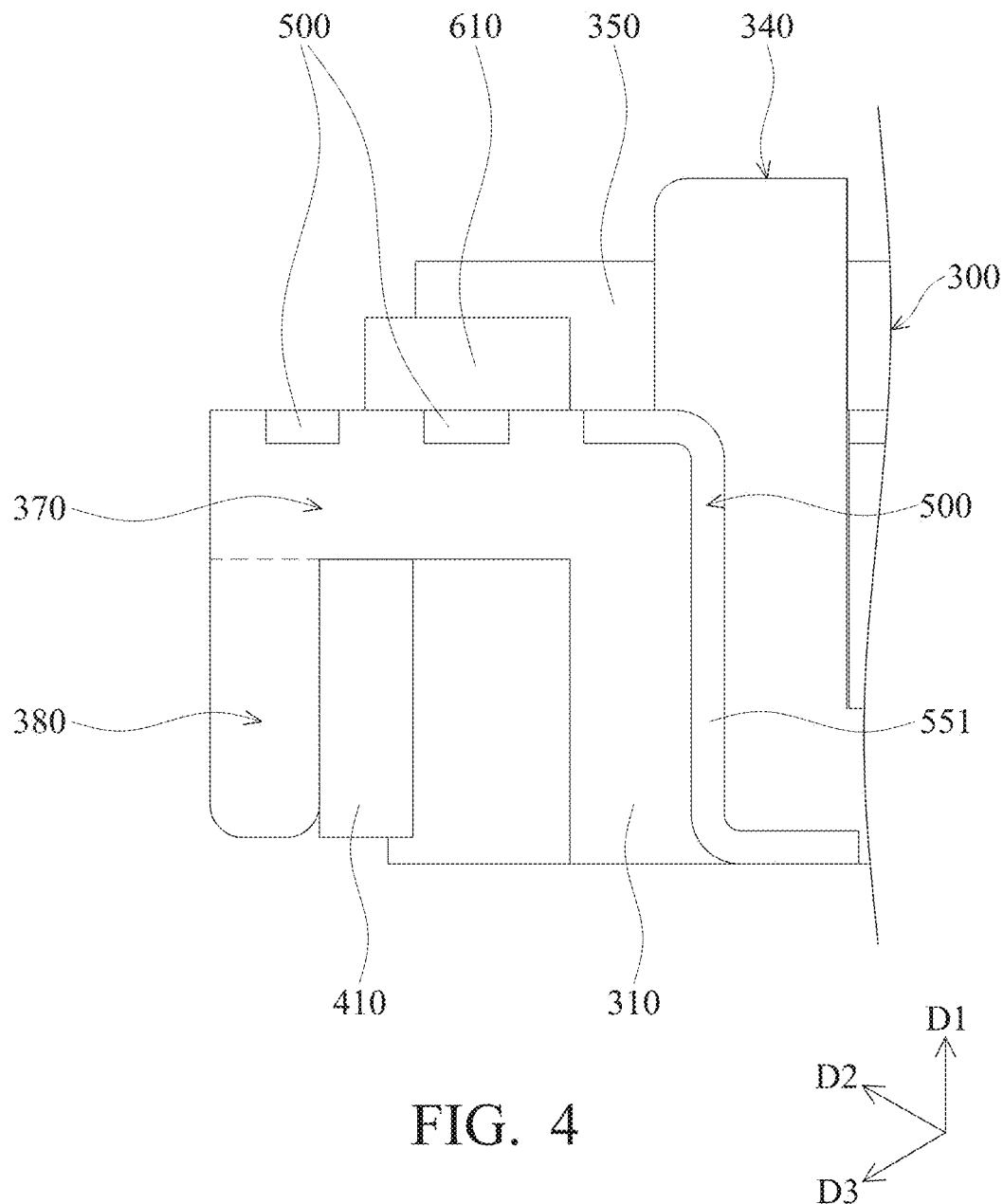
FIG. 4 is a partial side view of the holder and the coil according to some embodiments of the disclosure.

FIG. 4 is a partial cross-sectional view of the holder 300 and the first coil 410 of FIG. 3. As shown in FIG. 4, the fixed portion for the driving assembly 370 and the holding portion for the driving assembly 380 extend in different directions. The fixed portion for the driving assembly 370 extends from the body 310 in a direction away from the first axis D1, and the holding portion for the driving assembly 380 extends from the fixed portion for the driving assembly 370 along the first axis D1. The first coil 410 is located between the holding portion for the driving assembly 380 and the body 310.

Figure 5:
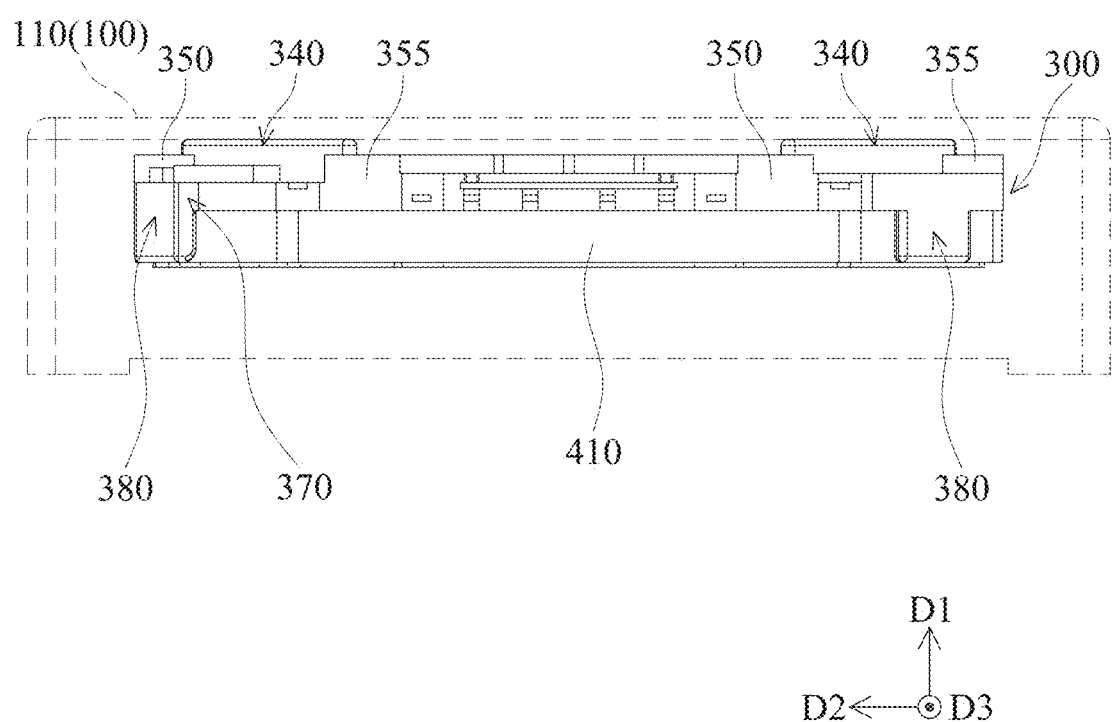
FIG. 5 is a schematic diagram of the holder and the housing in the limiting position according to some embodiments of the disclosure.

FIG. 5 depicts a schematic diagram of the holder 300 at a limiting position. For illustration purposes, the housing 110 is shown in dashed lines. The stopper component 340 has a protruding structure to limit the range of the movement of the holder 300. The shortest distance between the stopper component 340 and the housing 110 is smaller than the shortest distance between the first protruding platform 350 or the second protruding platform 355 and the housing 110.

As shown in FIG. 5, when the holder 300 moves to the limiting position relative to the fixed portion 100, the stopper component 340 is in direct contact with the housing 110. When the holder 300 moves to the limiting position, this configuration may prevent the holder 300 from directly colliding with the housing 110 and damaging the optical component 200 (FIG. 7B) disposed in the holder 300.

Figure 6A:
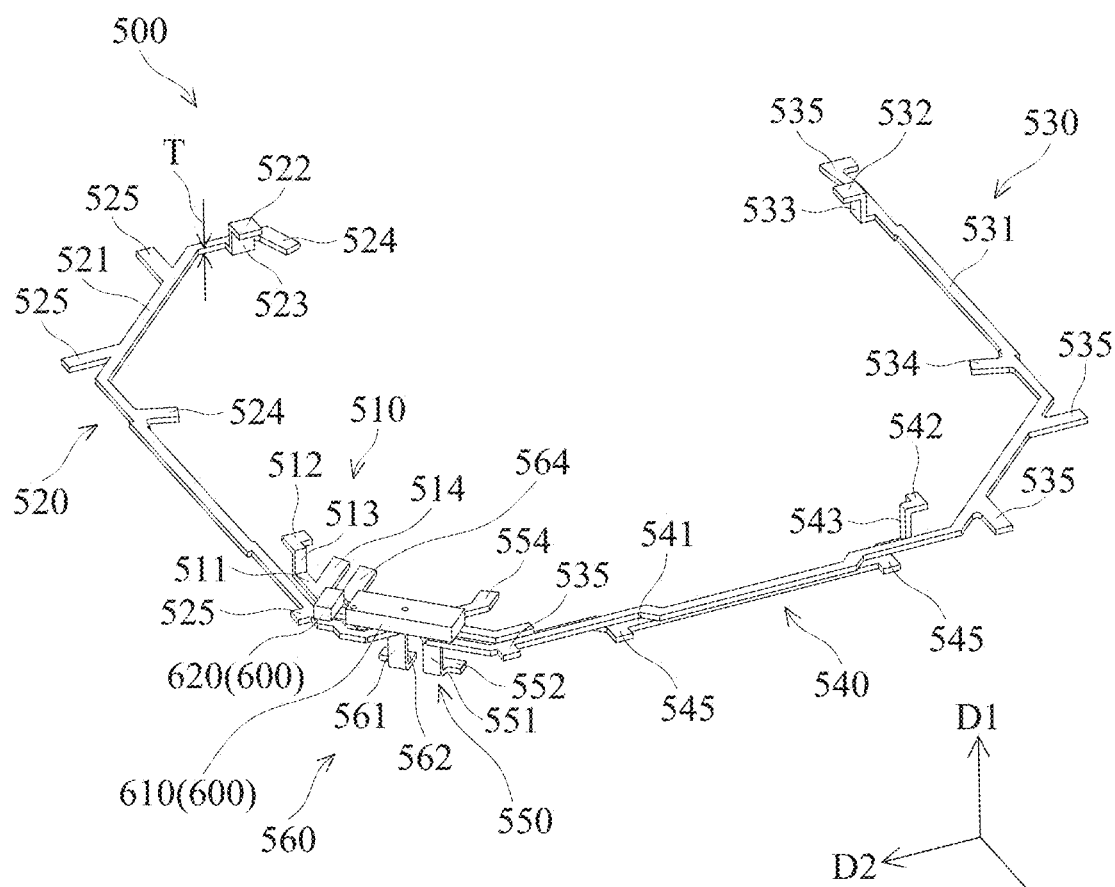
FIG. 6A is a perspective view of the first circuit assembly according to some embodiments of the disclosure.

FIG. 6A is a perspective view of the first circuit assembly 500. In FIG. 6A, in addition to the first circuit assembly 500, the sensing component 610 and the capacitor 620 can also be seen. The first circuit assembly 500 includes a first circuit component 510, a second circuit component 520, a third circuit component 530, a fourth circuit component 540, a fifth circuit component 550, and a sixth circuit component 560.

Figure 6B:
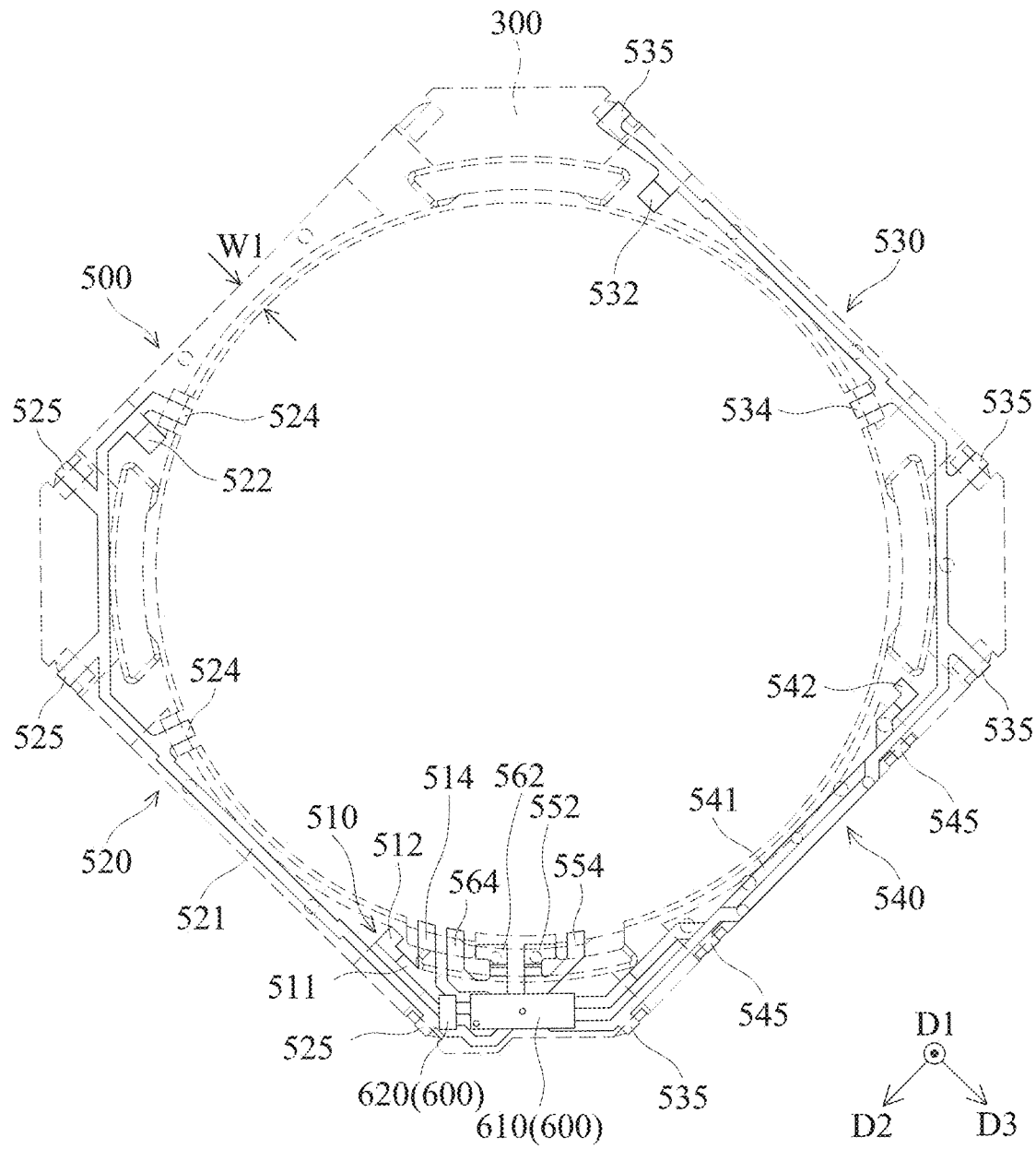
FIG. 6B is a top view of the first circuit assembly and the holder shown in dashed lines according to some embodiments of the disclosure.
Figure 6C:
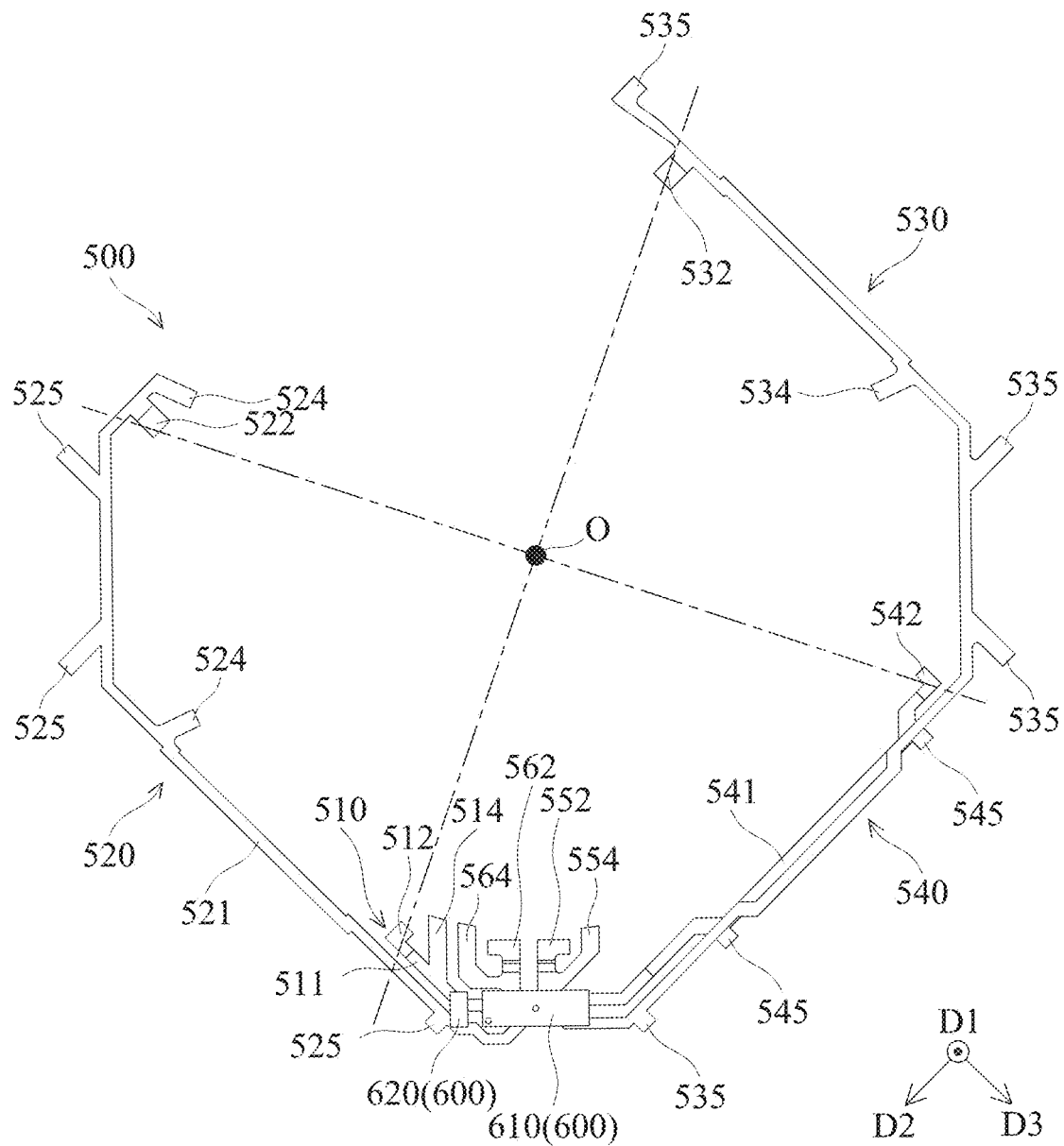
FIG. 6C is a top view of the first circuit assembly according to some embodiments of the disclosure.

FIG. 6B shows a top view of the first circuit assembly 500 and the holder 300 shown in dashed lines. FIG. 6C shows a top view of the first circuit assembly 500. Referring to FIGS. 6A to 6C, the first circuit component 510, the second circuit component 520, the third circuit component 530, the fourth circuit component 540, the fifth circuit component 550, and the sixth circuit component 560 are strip structure. That is to say, its length is greater than its width and thickness, and its thickness T is between 0.05 mm and 0.25 mm.

The first circuit component 510, the second circuit component 520, the third circuit component 530, the fourth circuit component 540, the fifth circuit component 550, and the sixth circuit component 560 at least partially embedded in the body 310 of the holder 300 and at least partially not exposed on the body 310 of the holder 300 (as shown in FIGS. 2A to 2B). In addition, the first circuit component 510, the second circuit component 520, the third circuit component 530, the fourth circuit component 540, the fifth circuit component 550, and the sixth circuit component 560 is electrically connected to the sensing component 610.

That is, a portion of the first circuit component 510, the second circuit component 520, the third circuit component 530, the fourth circuit component 540, the fifth circuit component 550, and the sixth circuit component 560 are embedded in the holder 300 and not exposed on the body 310. Therefore, the entire first circuit assembly 500 cannot be seen from the outside of the holder 300.

The first circuit component 510 has a first segment portion 511, a first circuit contact 512, a first bending portion 513, and a strengthening portion 514. The first segment portion 511 generally extends along the third axis D3 perpendicular to the first axis D1. The first segment portion 511 is connected to the first circuit contact 512 via the first bending portion 513. The first bending portion 513 extends along the first axis D1.

The second circuit component 520 has a second segment portion 521, a second circuit contact 522, a second bending portion 523, two strengthening portions 524, and three clamping portions 525. The second segment portion 521 extends in a direction that is perpendicular to the first axis D1. In detail, the second segment portion 521 extends parallel to a plane formed by the second axis D2 and the third axis D3. The second segment portion 521 is connected to the second circuit contact 522 via the second bending portion 523. The second bending portion 523 extends along the first axis D1.

The third circuit component 530 has a third segment portion 531, a third circuit contact 532, a third bending portion 533, a strengthening portion 534, and four clamping portions 535. The third segment portion 531 extends in a direction that is perpendicular to the first axis D1. In detail, the third segment portion 531 extends parallel to a plane formed by the second axis D2 and the third axis D3. The third segment portion 531 is connected to the third circuit contact 532 via the third bending portion 533. The third bending portion 533 extends along the first axis D1.

The fourth circuit component 540 has a fourth segment portion 541, a fourth bending portion 543, a fourth circuit contact 542, and two clamping portions 545. The fourth segment portion 541 generally extends on the second axis D2. The fourth segment portion 541 is connected to the fourth circuit contact 542 via the fourth bending portion 543. The fourth bending portion 543 extends along the first axis D1.

When viewed along the second axis D2, the first segment portion 511, the second segment portion 521, the third segment portion 531, and the fourth segment portion 541 are approximately on the same level, that is to say, they are on the same height in the second axis D2. When viewed along the second axis D2, the first circuit contact 512, the second circuit contact 522, the third circuit contact 532, and the fourth circuit contact 542 are approximately on the same level, that is, they are on the same height in the second axis D2.

The first circuit contact 512, the second circuit contact 522, the third circuit contact 532, and the fourth circuit contact 542 are each located on the four first protruding platforms 350 of the holder 300 (as shown in FIGS. 2A to 2B).

The sensing component 600 is electrically connected to the first elastic component 700 (FIG. 1) via the first circuit contact 512, the second circuit contact 522, the third circuit contact 532, and the fourth circuit contact 542, and is electrically connected to an external circuit (not shown) through the first elastic component 700.

When viewed along the first axis D1, the positions of the first circuit contact 512, the second circuit contact 522, the third circuit contact 532, and the fourth circuit contact 542 have rotational symmetry.

That is to say, when viewed along the first axis D1, with the optical axis O as the center point, the positions of the four circuit contacts may coincide with the original positions after the four circuit contacts are rotated.

For example, after four circuit contacts are rotated 90 degrees clockwise, the first circuit contact 512 may be rotated to coincide with the previous position of the second circuit contact 522; the second circuit contact 522 may be rotated to coincide with the previous position of the third circuit contact point 532.

The fifth circuit component 550 and the sixth circuit component 560 are electrically connected to the sensing component 610. The sensing component 610 is electrically connected to the first coil 410 via the fifth circuit component 550 and the sixth circuit component 560.

The fifth circuit component 550 includes a fifth segment portion 551, a fifth circuit contact 552, and a strengthening portion 554. The sixth circuit component 560 includes a sixth segment portion 561, a sixth circuit contact 562, and a strengthening portion 564. The fifth segment portion 551 and the sixth segment portion 561 extend along the first axis D1. The fifth segment portion 551 is perpendicular to the fifth circuit contact 552. The sixth segment portion 561 is perpendicular to the sixth circuit contact 562.

The fifth segment portion 551 and the sixth segment portion 561 are partially embedded in the holder 300. When viewed in a direction perpendicular to the first axis D1, the fifth segment portion 551 and the sixth segment portion 561 at least partially overlap the first coil 410 (for example, the fifth segment portion 551 shown in FIG. 4).

The presence of the strengthening portions 514, 524, 534, 554, and 564 increases the contact area for securing the optical component 200 (FIG. 7B). The arrangement of the strengthening portions 514, 524, 534, 554, and 564 can strengthen the fixation between the optical component 200 and the holder 300, and may assist in secure the optical component 200 to the holder 300 more firmly.

The configuration of the strengthening portions 514, 524, 534, 554, and 564 in the holder 300 is described in detail in relation to FIGS. 7A to 7B. When the assembly is in production, the clamping portions 525, 535, and 545 are terminals that may be used to clamp and position the components. The clamping portions 525, 535, and 545 may be partially exposed to the holder 300.

Figure 6D:
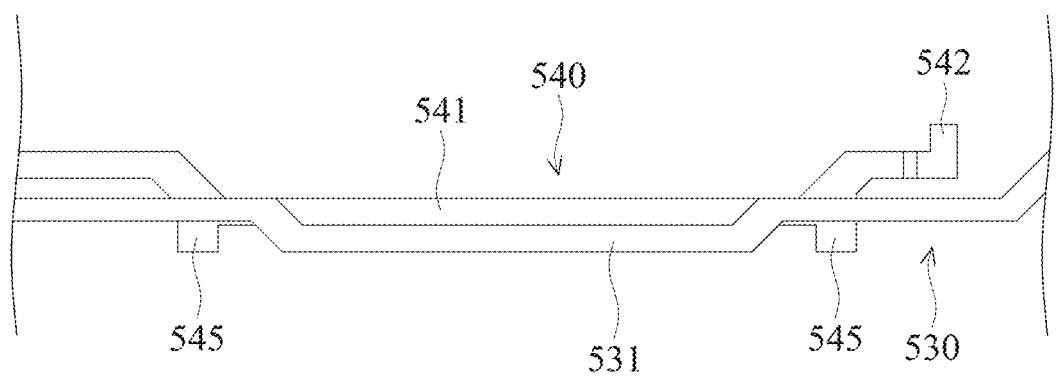
FIG. 6D is a partial top view of portion of the third circuit component and portion of the fourth circuit component according to some embodiments of the disclosure.
Figure 6E:
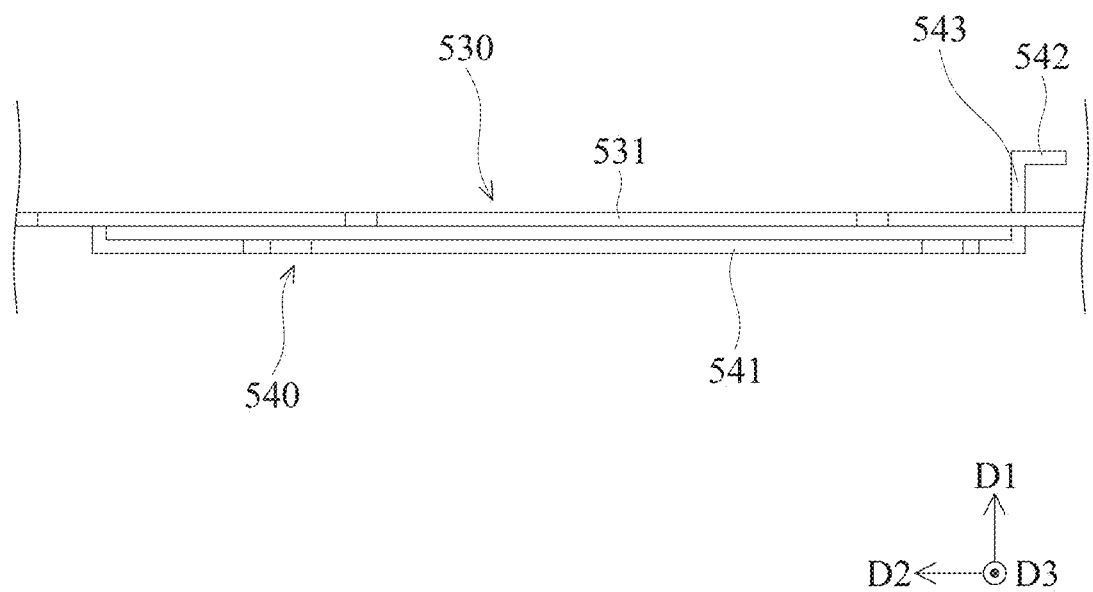
FIG. 6E is a partial side view of portion of the third circuit component and portion of the fourth circuit component according to some embodiments of the disclosure.

Please refer to FIG. 6D to 6E. FIG. 6D shows a top view of the third segment portion 531 and the fourth segment portion 541 that partially overlap each other. FIG. 6E shows a side view of the third segment portion 531 and the fourth segment portion 541, and the fourth circuit contact 542 and the fourth bending portion 543 of the fourth circuit component 540 can also be seen.

With the configuration of the first circuit assembly 500, the third segment portion 531 and the fourth segment portion 541 are partially overlapped. Thus, each side of the holder 300 in this embodiment only needs to accommodate the width of one circuit component. Therefore, the side width W1 of the holder 300 may also be designed into a smaller size to achieve the function of miniaturization.

Please refer to FIGS. 7A to 7B. FIG. 7A shows the accommodating space 360 and the strengthening portions 514, 554, 564 at least partially exposed to the accommodating space 360. FIG. 7B is a schematic side view showing the contact of the optical component 200, the strengthening portion 514, and the adhesive component 900.

As shown in FIG. 7B, the optical component 200 is fixedly connected to the holder 300 via the adhesive component 900, the adhesive component 900 is in direct contact with the strengthening portion 514, and the strengthening portion 514 and the adhesive component 900 contact the optical component 200, so that the optical component 200 is fixedly disposed in the accommodating space 360. The strengthening portions 524, 534, 554, and 564 also secure the optical component 200 in the accommodating space 360 in the same way that the strengthening portion 514 contacts the optical component 200.

Figure 8:
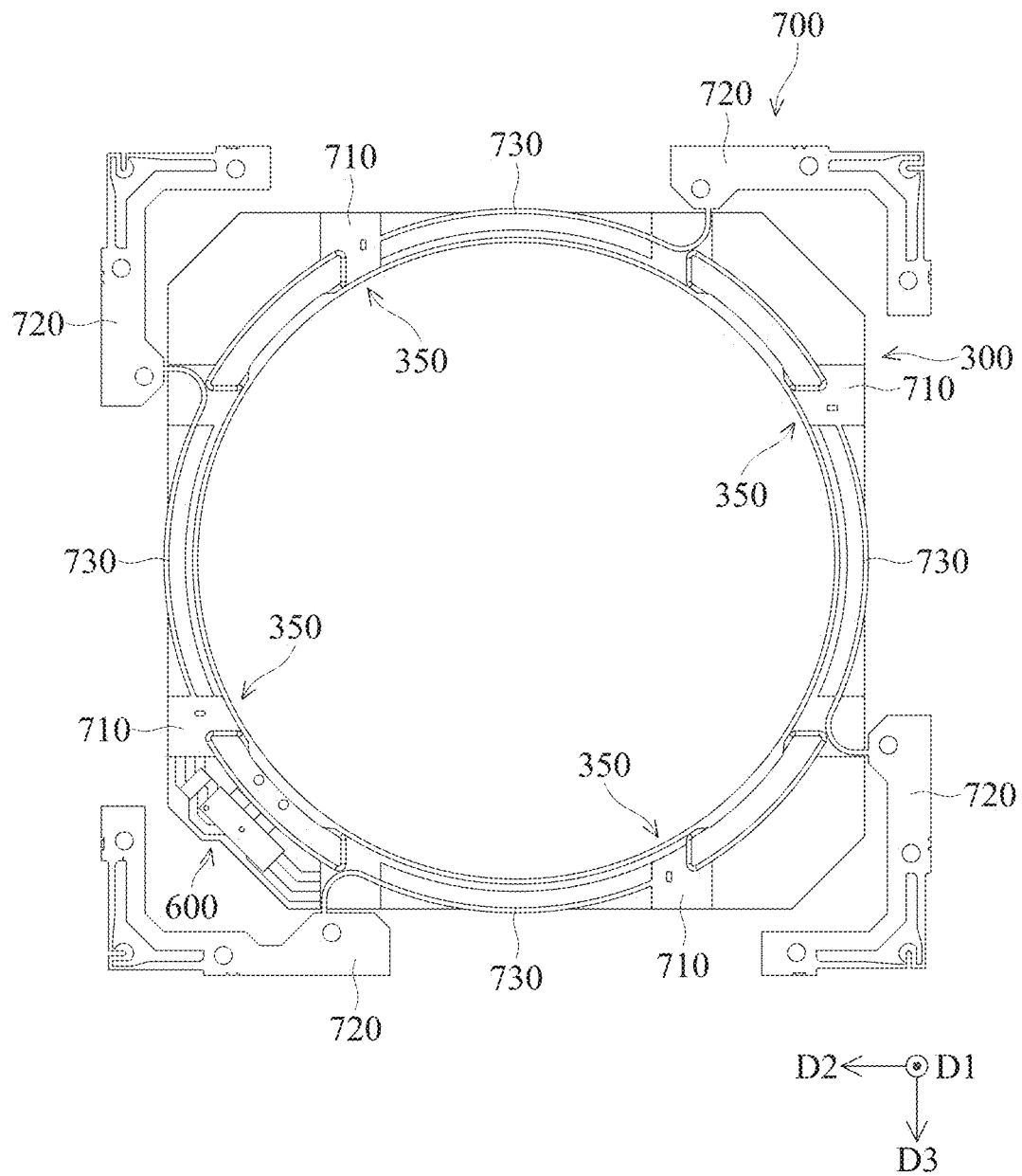
FIG. 8 is a top view of the first elastic component and the holder according to some embodiments of the disclosure.

FIG. 8 is a top view showing the first elastic component 700 and the holder 300. The first elastic component 700 has four fixed ends for the movable portion 710, four fixed ends for the fixed portion 720, and four first strings 730. The fixed end for the movable portion 710 is connected to the fixed ends for the fixed portion 720 via the first string 730. The fixed ends for the movable portions 710 of the first elastic component 700 contact the first circuit contact 512, the second circuit contact 522, the third circuit contact 532, and the fourth circuit contact 542 located on the first protruding platform 350 (FIG. 2B), respectively.

Since the positions of the first circuit contact 512, the second circuit contact 522, the third circuit contact 532, and the fourth circuit contact 542 have rotational symmetry in the embodiment shown in FIG. 6A and FIG. 6B, the positions of the fixed ends for the movable portion 710 of the first elastic component 700 connected thereto also have rotational symmetry.

Figure 9A:
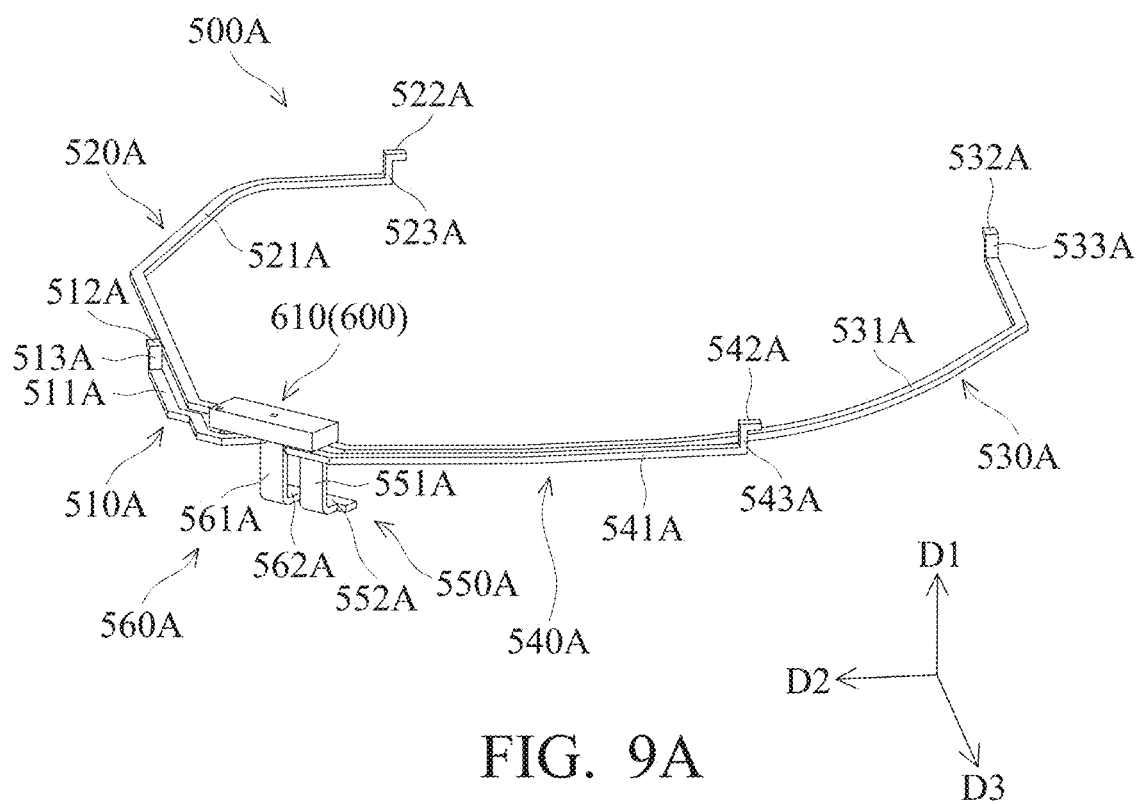
FIG. 9A is a perspective view of the first circuit assembly according to some embodiments of the disclosure.
Figure 9B:
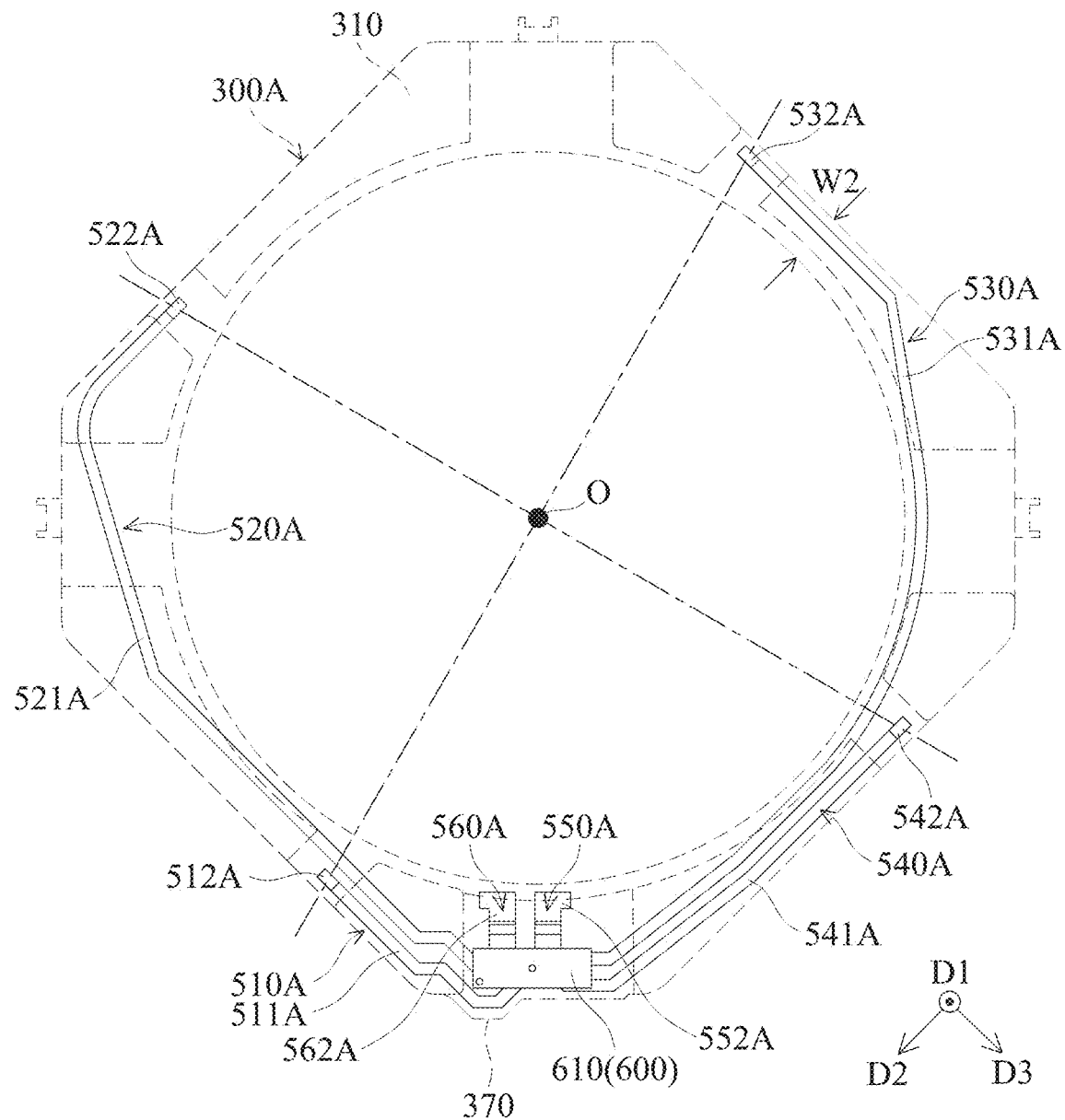
FIG. 9B is a top view of the first circuit assembly and the holder shown in dashed lines according to some embodiments of the disclosure.
Figure 9C:
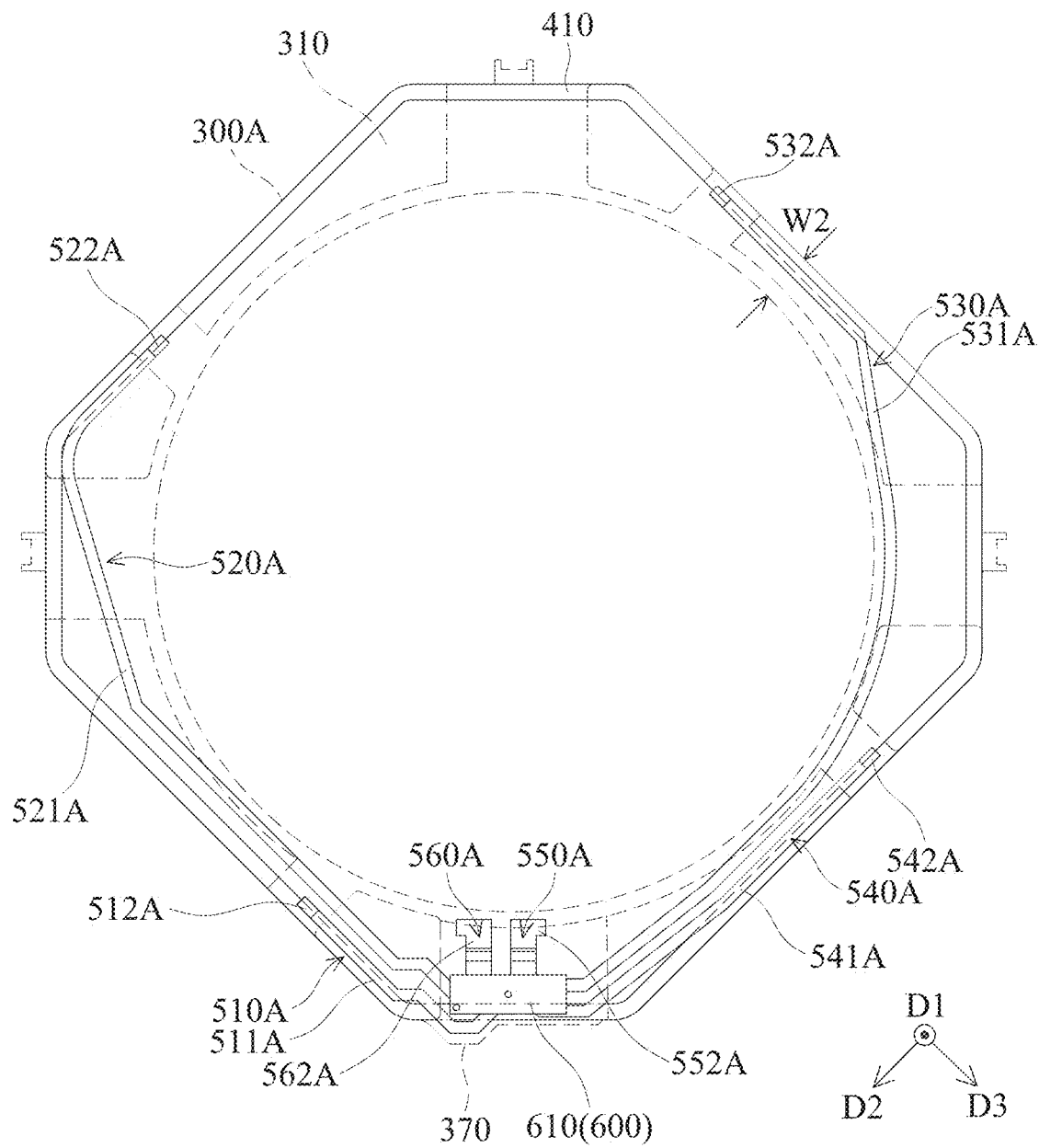
FIG. 9C is a top view of the first circuit assembly, the coil, and the holder shown in dashed lines according to some embodiments of the present disclosure.

FIGS. 9A to 9C show perspective views of a holder 300A and a first circuit assembly 500A according to another embodiment of the disclosure. In FIG. 9A, the first circuit assembly 500A and the sensing component 610 can be seen. The first circuit assembly 500A in FIGS. 9A to 9C is generally similar to the first circuit assembly 500 in FIGS. 6A to 6E, and has common features and functions, the details of which will be described in detail below.

FIG. 9A shows a perspective view of the first circuit assembly 500A and the sensing component 610. FIG. 9B shows a top view of the first circuit assembly 500A and the holder 300A shown in dashed lines. FIG. 9C shows a top view of the holder 300A, the first coil 410, and the first circuit component 500A shown in dashed lines.

Similar to the first circuit assembly 500 depicted in FIGS. 6A to 6E, the first circuit assembly 500A in FIGS. 9A to 9C has a first circuit component 510A, a second circuit component 520A, and a third circuit component 530A, a fourth circuit component 540A, a fifth circuit component 550A, and a sixth circuit component 560A.

The first circuit component 510A has a first segment portion 511A, a first circuit contact 512A, and a first bending portion 513A. The second circuit component 520A has a second segment portion 521A, a second circuit contact 522A, and a second bending portion 523A. The third circuit component 530A has a third segment portion 531A, a third circuit contact 532A, and a third bending portion 533A. The fourth circuit component 540A has a fourth segment portion 541A, a fourth circuit contact 542A, and a fourth bending portion 543A.

The fifth circuit component 550A includes a fifth segment portion 551A and a fifth circuit contact 552A. The sixth circuit component 560A includes a sixth segment portion 561A and a sixth circuit contact 562A.

The first circuit component 510A, the second circuit component 520A, the third circuit component 530A, the fourth circuit component 540A, the fifth circuit component 550A, and the sixth circuit component 560A have common features and functions as the first circuit component 510, the second circuit component 520, the third circuit component 530, the fourth circuit component 540, the fifth circuit component 550, and the sixth circuit component 560 described in FIGS. 6A to 6E.

The difference between the first circuit assembly 500A in FIGS. 9A to 9C and the first circuit assembly 500 in FIGS. 6A to 6E is that when viewed along the first axis D1, the first segment portion 511A and a portion of the second segment portion 521A are generally parallel and side by side with each other, and a portion of the third segment portion 531A and the fourth segment portion 541A are generally parallel and side by side with each other. Regardless of the size of the side width W2 of the holder 300A, a plurality of segment portions may be arranged in parallel and side by side, and the first circuit assembly 500A can be easily manufactured in such a side-by-side configuration.

The positions of the first circuit contact 510A, the second circuit contact 520A, the third circuit contact 530A, and the fourth circuit contact 540A are similar to the embodiments shown in FIGS. 6A to 6E and have rotational symmetry.

As shown in FIG. 9C, when viewed along the first axis D1, the first segment portion 511A, the second segment portion 521A, the third segment portion 531A, and the fourth segment portion 541A at least partially overlap the first coil 410. The first segment portion 511A is at least partially located in the fixed portion for the driving assembly 370. The second segment portion 521 and the third segment portion 531 described in FIGS. 6A to 6E may also at least partially overlap the first coil 410 in a similar manner.

Figure 10A:
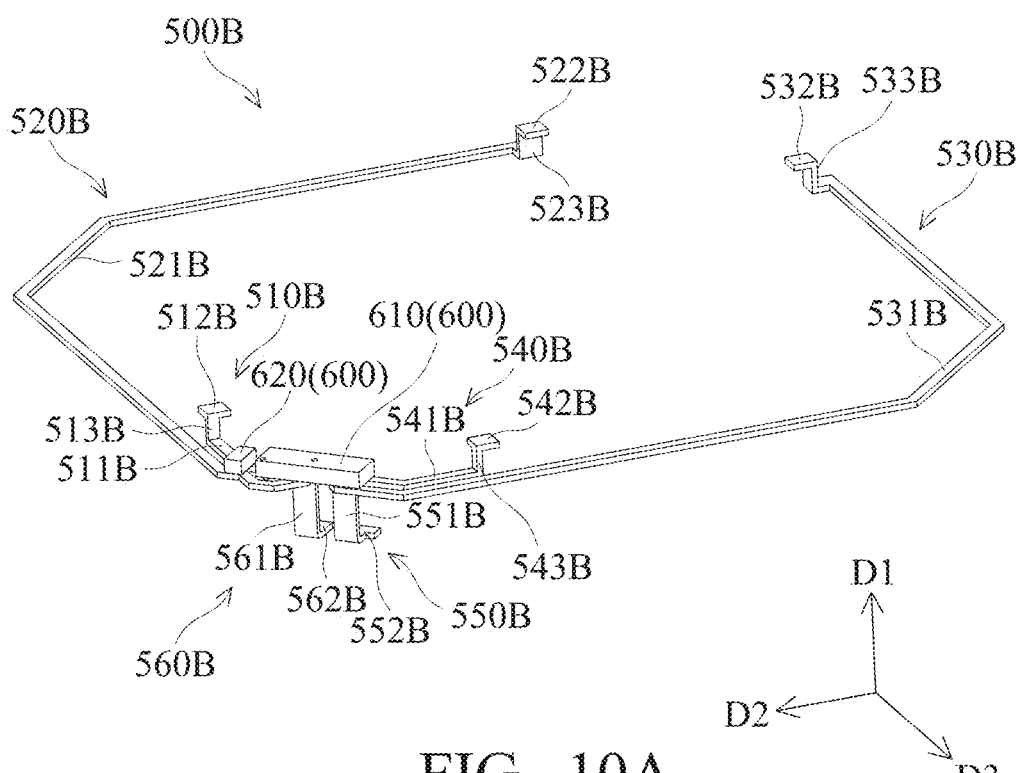
FIG. 10A is a perspective view of the first circuit assembly according to some embodiments of the disclosure.
Figure 10B:
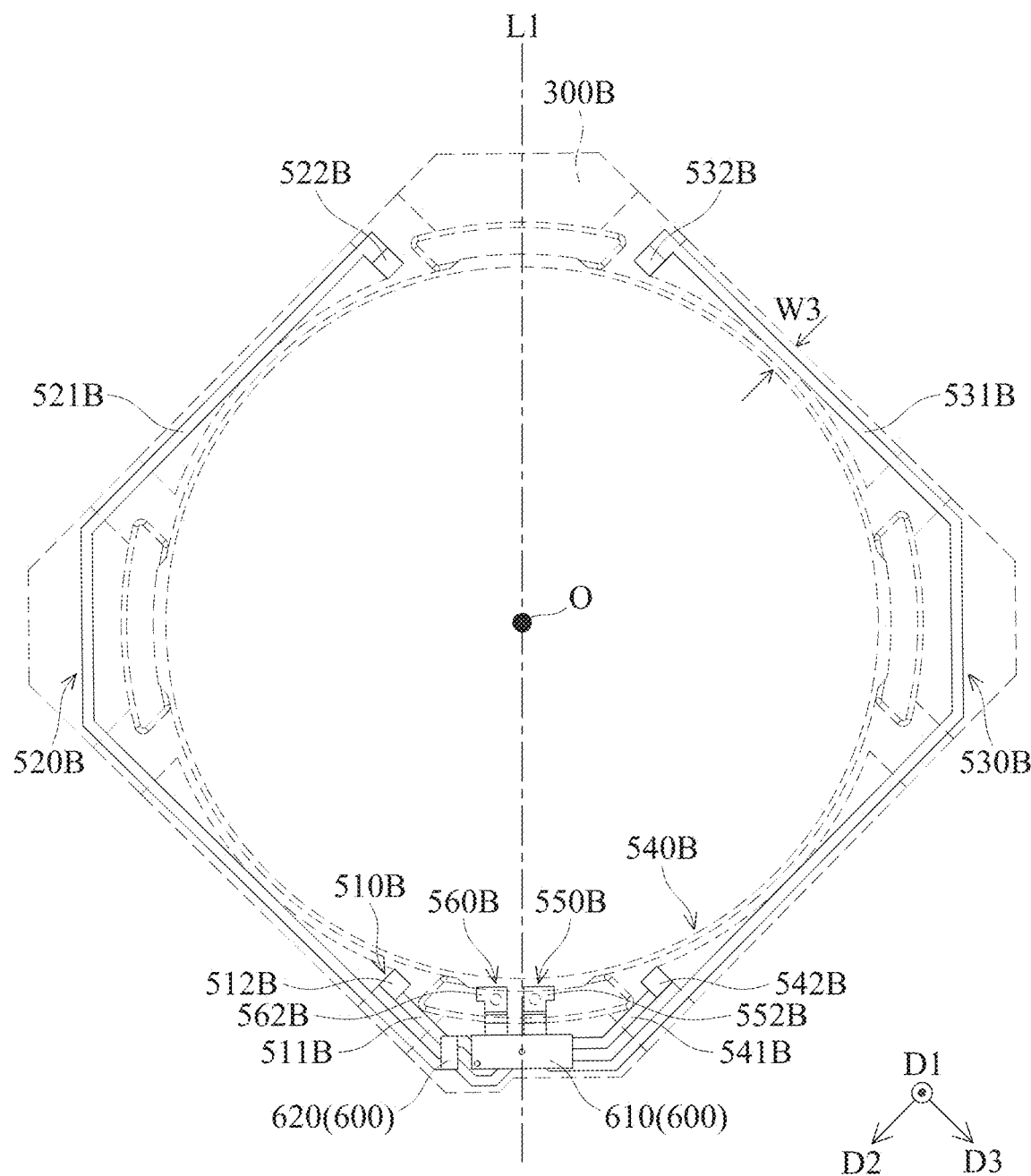
FIG. 10B is a top view of the first circuit assembly and the holder shown in dashed lines according to some embodiments of the disclosure.

FIGS. 10A to 10B show perspective views of a holder 300B and a first circuit assembly 500B according to another embodiment of the present disclosure. In FIG. 10A, the first circuit component 500B and the sensing component 600 can be seen. The first circuit assembly 500B in FIGS. 10A to 10B is generally similar to the first circuit assembly 500 in FIGS. 6A to 6E, and has common features and functions, the details of which will be described in detail below.

FIG. 10A shows a perspective view of the first circuit component 500B and the sensing component 600. FIG. 10B shows a top view of the first circuit assembly 500B and the holder 300B shown in dashed lines. Similar to the first circuit assembly 500 depicted in FIGS. 6A to 6E, the first circuit assembly 500B in FIGS. 10A to 10B has a first circuit component 510B, a second circuit component 520B, and a third circuit component 530B, a fourth circuit component 540B, a fifth circuit component 550B, and a sixth circuit component 560B.

The first circuit component 510B has a first segment portion 511B, a first circuit contact 512B, and a first bending portion 513B. The second circuit component 520B has a second segment portion 521B, a second circuit contact 522B, and a second bending portion 523B. The third circuit component 530B has a third segment portion 531B, a third circuit contact 532B, and a third bending portion 533B. The fourth circuit component 540B has a fourth segment portion 541B, a fourth circuit contact 542B, and a fourth bending portion 543B.

The fifth circuit component 550B includes a fifth segment portion 551B and a fifth circuit contact 552B. The sixth circuit component 560B includes a sixth segment portion 561B and a sixth circuit contact 562B.

The first circuit component 510B, the second circuit component 520B, the third circuit component 530B, the fourth circuit component 540B, the fifth circuit component 550B, and the sixth circuit component 560B have common features and functions as the first circuit component 510, the second circuit component 520, the third circuit component 530, the fourth circuit component 540, the fifth circuit component 550, and the sixth circuit component 560 described in FIGS. 6A to 6E.

The first circuit assembly 500B in FIGS. 10A to 10B is different from the first circuit assembly 500 in FIGS. 6A to 6E in that: when viewed along the first axis D1, the first circuit contact 512B, the second circuit contact 522B, the third circuit contact 532B, and the fourth circuit contact 542B have a line of symmetry.

In other words, as shown by the dash line L1 in FIG. 10B, if the first circuit contact 512B, the second circuit contact 522B, the third circuit contact 532B, and the fourth circuit contact 542B are folded along the dash line L1, the first circuit contact 512B will coincide with the fourth circuit contact 542B; the second circuit contact 522B will coincide with the third circuit contact 532B.

With the configuration of the first circuit component 500B, the first circuit component 510B and the fourth circuit component 540B are both located closer to the sensing component 600. Therefore, each side of the holder 300B in this embodiment only needs to accommodate the width of one circuit component. Therefore, the side width W3 of the holder 300B may also be designed into a smaller size to achieve the function of miniaturization.

Although in the embodiment shown in FIGS. 9A to 10B, the first circuit assembly 500A and the first circuit assembly 500B do not include the strengthening portion and the clamping portion, the first circuit assembly 500A and the first circuit assembly 500B may also optionally include the features of a strengthening portion and a clamping portion.

Figure 11:
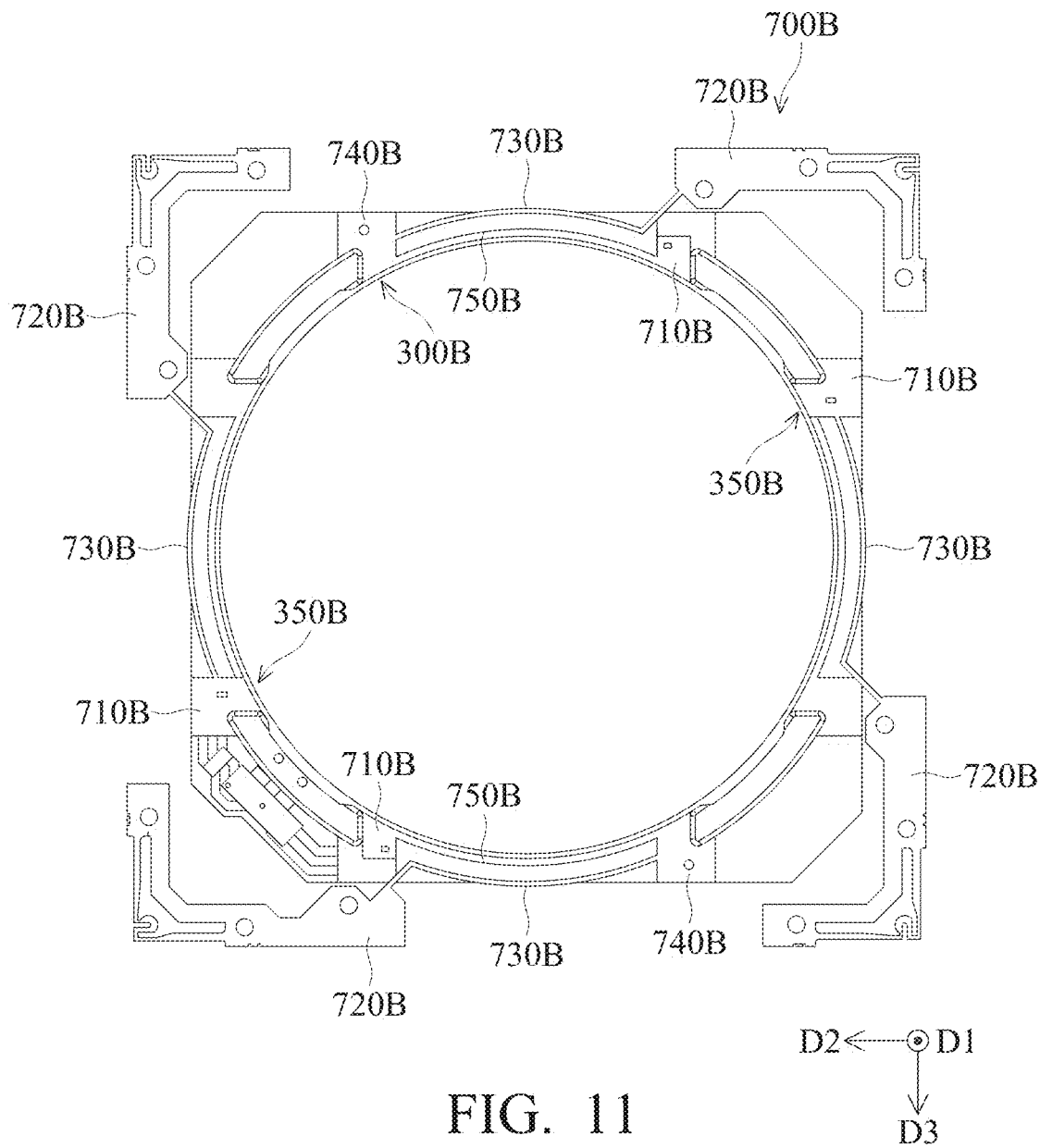
FIG. 11 is a top view of the first elastic component and the holder according to some embodiments of the disclosure.

FIG. 11 is a top view showing the first elastic component 700B and the holder 300B. The first elastic component 700B has four fixed ends for the movable portion 710B, four fixed ends for the fixed portion 720B, four first strings 730B, two connecting portions 740B, and two second strings 750B.

Referring to FIG. 11, when viewed along the first axis D1, the upper, lower, left, and right sides of the holder 300B are respectively connected to the first elastic component 700B via the fixed ends for the movable portion 710B. The fixed ends for the movable portion 710B located on the left and right sides of the holder 300B are each connected to the fixed ends for the fixed portion 720B via the first string 730B. The two fixed ends for the movable portion 710B each contact the first circuit contact 512B and the third circuit contact 532B located on the first protrusion 350B (FIG. 10B).

Continuing to refer to FIG. 11, when viewed along the first axis D1, a pair of the fixed ends for fixed portion 720B located at the upper right and lower left of the diagonal positions are connected to the connecting portion 740B via the first strings 730B. The connecting portion 740B is connected to the fixed end for the movable portion 710B via the second string 750B. The two fixed end for the movable portion 710B each contact the second circuit contact 522B and the fourth circuit contact 542B located on the first protrusion 350B (FIG. 10B).

Since the positions of the first circuit contact 512B, the second circuit contact 522B, the third circuit contact 532B, and the fourth circuit contact 542B have a line of symmetry in the embodiment shown in FIG. 10B, the positions of the two pairs of fixed ends for the movable portion 710B connected thereto in the FIG. 11 also have a line of symmetry.

The present invention discloses an optical component driving mechanism, in which a holder connected to the optical component may be driven to move along a first axis to achieve automatic focusing. Different from the prior art of disposed the first circuit assembly on the base or the frame, the first circuit assembly is disposed within the holder in the present disclosure. This configuration not only enables the optical component driving mechanism of the present disclosure to achieve a miniaturization function, but also improves the problem of magnetic interference between magnetic components in the prior art.

The present disclosure also provides three implementations, so that the first circuit component, the second circuit component, the third circuit component, and the fourth circuit component are arranged in different configurations in response to different space constraints of the holder.

The ordinal numbers in this specification and the claim, such as "first", "second", etc., do not have a sequential relationship between each other, and they are only used to distinguish two different components with the same name.

Although embodiments of the present disclosure and their advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope of such processes, machines, manufacture, and compositions of matter, means, methods, or steps. In addition, each claim constitutes a separate embodiment, and the combination of various claims and embodiments are within the scope of the disclosure.

It will be apparent to those skilled in the art that various modifications and variations can be made in the invention. It is intended that the standard and examples be considered as exemplary only, with the true scope of the disclosed embodiments being indicated by the following claims and their equivalents.

What is claimed is:

1. An optical component driving mechanism, comprising:
 a holder configured to connect an optical component;
 a fixed portion, wherein the holder is movable relative to the fixed portion;
 a driving assembly configured to drive the holder to move relative to the fixed portion; and
 a first circuit assembly, fixedly disposed on the holder;
 wherein the first circuit assembly is electrically connected to the driving assembly;
 wherein the holder comprises:
 a body;
 a fixed portion for the driving assembly, protruding outward from the body, configured to secure a first coil of the driving assembly; and
 a holding portion for the driving assembly, protruding from the fixed portion for the driving assembly, configured to secure the first coil;
 wherein an extending direction of the fixed portion for the driving assembly and an extending direction of the holding portion for the driving assembly are different, and the first coil is located between the holding portion for the driving assembly and the body.

2. The optical component driving mechanism as claimed in claim 1, further comprising a sensing assembly comprising a sensing component, wherein the sensing assembly is configured to sense the movement of the holder.

3. The optical component driving mechanism as claimed in claim 2, wherein the holder further comprises:
 a first groove, having a groove structure, for accommodating the sensing component;
 a stopper component, having a protruding structure, configured to limit the range of movement of the holder;
 a first protruding platform, having a protruding structure, adjacent to the first groove; and
 an accommodating space, for accommodating the optical component.

4. The optical component driving mechanism as claimed in claim 3, wherein when the holder is in a first limit position, the stopper component is in direct contact with the fixed portion, and the shortest distance between the stopper component and the fixed portion is smaller than the shortest distance between the first protruding platform and the fixed portion.

5. The optical component driving mechanism as claimed in claim 4, further comprising a first elastic component comprising a fixed end for a movable portion, wherein the first elastic component has a plate-like structure perpendicular to a first axis, wherein the holder is movably connected to the fixed portion via the first elastic component, and the fixed end for the movable portion is fixedly disposed on the first protruding platform.

6. The optical component driving mechanism as claimed in claim 5, further comprising a second elastic component having a plate-like structure perpendicular to the first axis, wherein the holder is movably connected to the fixed portion via the second elastic component, the driving assembly is electrically connected to the second elastic component, the first circuit assembly is electrically connected to the driving assembly via the second elastic component, the first elastic component and the second elastic component are arranged along the first axis.

7. The optical component driving mechanism as claimed in claim 6, wherein the first circuit assembly comprises a first circuit component having a strip structure, a first segment portion, and a first circuit contact, and the first circuit component is electrically connected to the sensing component, a thickness of the first circuit component is between 0.05 mm and 0.25 mm, the first circuit component is at least partially embedded in the body and at least partially not exposed on the body, and the first segment portion extends in a direction perpendicular to the first axis, the sensing component is electrically connected to an external circuit via the first circuit contact, and the first circuit contact is disposed on the first protruding platform and is electrically connected to the first elastic component.

8. The optical component driving mechanism as claimed in claim 7, wherein the first circuit assembly comprises a second circuit component having a strip structure, a second segment portion, and a second circuit contact, and the second circuit component is electrically connected to the sensing component, a thickness of the second circuit component is between 0.05 mm and 0.25 mm, the second circuit component is at least partially embedded in the body and at least partially not exposed on the body, and the second segment portion extends in a direction that is perpendicular to the first axis, the second segment portion at least partially overlaps the first coil when viewed along the first axis, and the second circuit contact is electrically connected to the first elastic component.

9. The optical component driving mechanism as claimed in claim 8, wherein the first circuit assembly comprises a third circuit component having a strip structure, a third segment portion, and a third circuit contact, and the third circuit component is electrically connected to the sensing component, a thickness of the third circuit component is between 0.05 mm and 0.25 mm, the third circuit component is at least partially embedded in the body and at least partially not exposed on the body, and the third segment portion extends in a direction that is perpendicular to the first axis, the third segment portion at least partially overlaps the first coil when viewed along the first axis, and the third circuit contact is electrically connected to the first elastic component.

10. The optical component driving mechanism as claimed in claim 9, wherein the first circuit assembly comprises a fourth circuit component having a strip structure, a fourth segment portion, and a fourth circuit contact, and the fourth circuit component is electrically connected to the sensing component, a thickness of the fourth circuit component is between 0.05 mm and 0.25 mm, the fourth circuit component is at least partially embedded in the body and at least partially not exposed on the body, and the fourth segment portion extends in a direction that is perpendicular to the first axis, the fourth circuit contact is electrically connected to the first elastic component.

11. The optical component driving mechanism as claimed in claim 10, wherein the first circuit contact, the second circuit contact, the third circuit contact, and the fourth circuit contact have rotational symmetry when viewed along the first axis.

12. The optical component driving mechanism as claimed in claim 10, wherein the first circuit contact, the second circuit contact, the third circuit contact, and the fourth circuit contact have a line of symmetry when viewed along the first axis.

13. The optical component driving mechanism as claimed in claim 10, wherein the first segment portion is at least partially located in the fixed portion for the driving assembly, and the first segment portion and the first coil at least partially overlap when viewed along the first axis, the first segment portion and a portion of the second segment portion are parallel and side by side with each other, and a portion of the third segment portion and the fourth segment portion are parallel and side by side with each other when viewed along the first axis.

14. The optical component driving mechanism as claimed in claim 10, wherein the third segment portion and the fourth segment portion at least partially overlap when viewed along the first axis.

15. The optical component driving mechanism as claimed in claim 10, wherein the first circuit contact, the second circuit contact, the third circuit contact and the fourth circuit contact are on the same level when viewed along a second axis that is perpendicular to the first axis.

16. The optical component driving mechanism as claimed in claim 10, wherein the first segment portion, the second segment portion, the third segment portion, and the fourth segment portion are on the same level when viewed along a second axis that is perpendicular to the first axis.

17. The optical component driving mechanism as claimed in claim 10, wherein the first circuit component comprises a fifth circuit component having a strip structure and a fifth segment portion, and the fifth circuit component is electrically connected to the sensing component, a thickness of the fifth circuit component is between 0.05 mm and 0.25 mm, the fifth circuit component is at least partially embedded in the body and at least partially not exposed on the body, and the fifth segment portion extends along the first axis, the fifth segment portion at least partially overlaps the first coil when viewed along a second axis that is perpendicular to the first axis, and the first coil is electrically connected to the sensing component via the fifth circuit component.

18. The optical component driving mechanism as claimed in claim 17, wherein the optical component is fixedly connected to the holder via an adhesive component.

19. The optical component driving mechanism as claimed in claim 18, wherein each of the first circuit component, the second circuit component, the third circuit component, and the fifth circuit component comprises a strengthening portion, and the strengthening portion is at least partially exposed to the accommodating space, and the adhesive component is in direct contact with the strengthening portion.

\* \* \* \* \*